United States Patent [19]

Jagoda et al.

[11] 4,012,734
[45] Mar. 15, 1977

[54] SYNCHRONOUS POWER COMMUNICATING

[75] Inventors: Neil H. Jagoda, Framingham; Klaus Kubierschky, North Reading; Adrian G. Roy, Jr., Kingston, all of Mass.

[73] Assignee: American Science & Engineering, Inc., Cambridge, Mass.

[22] Filed: Feb. 9, 1976

[21] Appl. No.: 656,521

Related U.S. Application Data

[63] Continuation of Ser. No. 535,352, Dec. 23, 1974, abandoned.

[52] U.S. Cl. ............................ 340/310 A; 340/151
[51] Int. Cl.² ...................................... H04M 11/04
[58] Field of Search .................. 340/310 A, 310 R

[56] References Cited
UNITED STATES PATENTS

| | | | |
|---|---|---|---|
| 3,696,383 | 10/1972 | Oishi | 340/310 A |
| 3,702,460 | 11/1972 | Blose | 340/310 A |

*Primary Examiner*—Thomas B. Habecker
*Attorney, Agent, or Firm*—Charles Hieken; Jerry Cohen

[57] ABSTRACT

A remote meter-reading system interrogates meter stations over power lines and receives encoded meter readings over the power lines in synchronism with the power line frequency by superimposing a digitally modulated signal over the 60-Hz power frequency. The central control station transmits at a data rate of 60-baud and receives at a data rate that is 60-baud or a submultiple thereof, to reduce the demands on the remote meter station transceiver as compared to those on the central control unit transceiver. The bit clock at the central control unit and the meter stations is derived from the 60-Hz power line phase available at each station. Each meter station achieves message synchronization by continuously monitoring the data bit stream for a preset synchronization code and thereafter treats the following 21 data bits as address and function codes. Each meter station that is addressed responds at the data rate designated by the function code by transmitting with a message including the address and function bits for comparison at the central control station with that originally sent to facilitate error detection, and the meter reading encoded according to an error detecting code. A binary data bit is represented by quadrature phase lead and lag relative to reference phase of the character.

21 Claims, 29 Drawing Figures

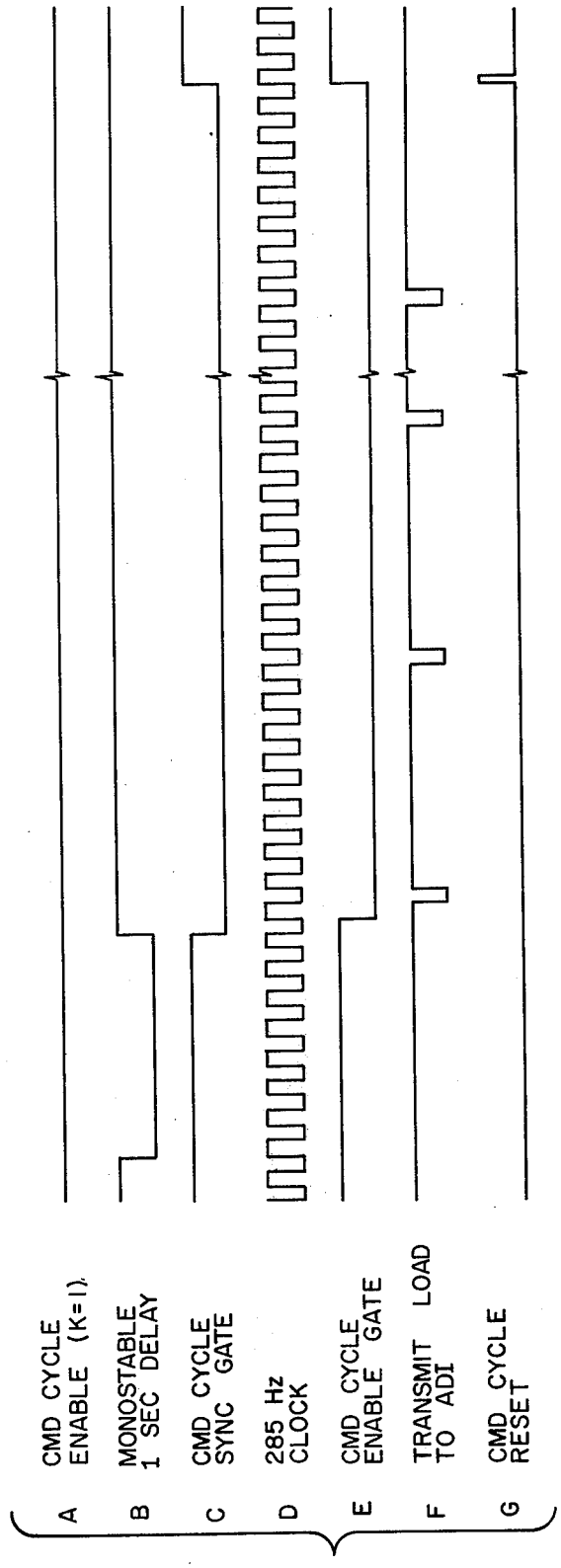
FIG. 9A
FIG. 9B
FIG. 13
A CMD CYCLE ENABLE (K=1)
B MONOSTABLE 1 SEC DELAY
C CMD CYCLE SYNC GATE
D 285 Hz CLOCK
E CMD CYCLE ENABLE GATE
F TRANSMIT LOAD TO ADI
G CMD CYCLE RESET

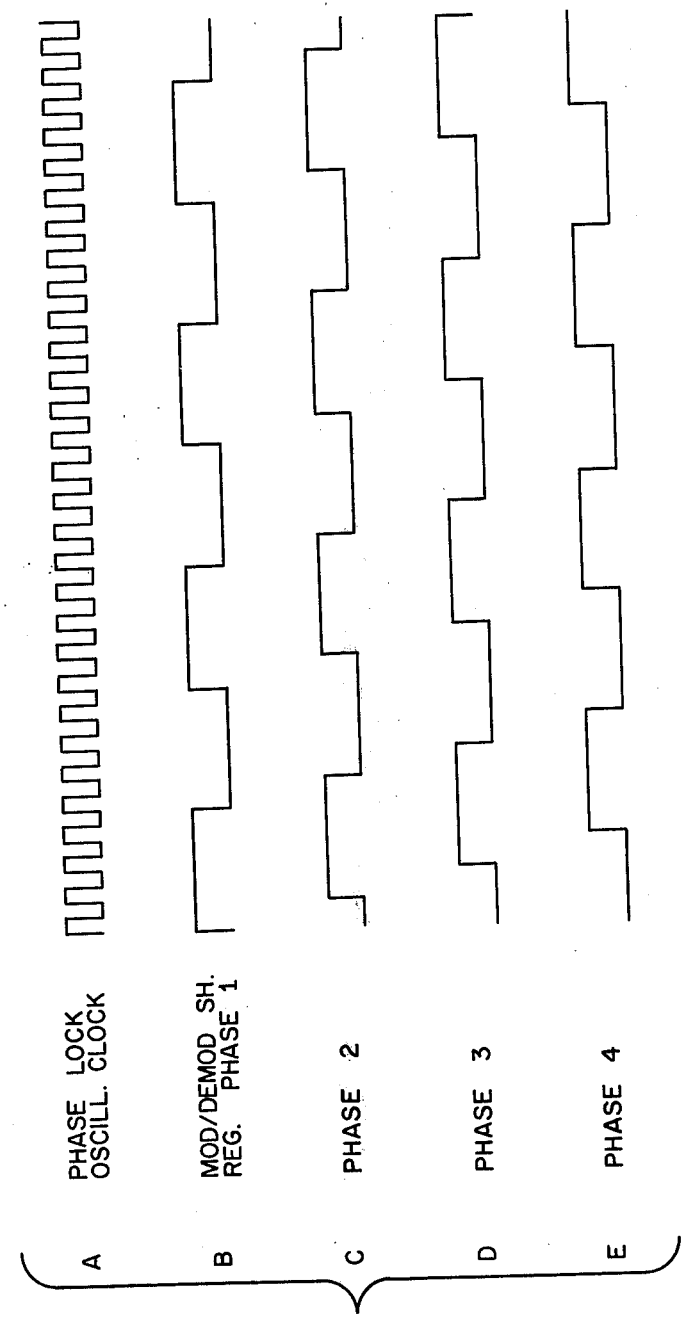

SYNCHRONOUS POWER COMMUNICATING

REFERENCE TO PRIOR APPLICATION

This application is a continuation of application Ser. No. 535,352 filed 12/23/74, and now abandoned.

BACKGROUND OF THE INVENTION

The present invention relates in general to communicating over power lines and more particularly concerns novel techniques and apparatus for exchanging digital data over distribution power lines between a central control unit and remote meter or control modules. The invention is especially useful in facilitating automatically monitoring and controlling the power distribution system and reading meters at remote locations with good reliability. It accomplishes this using the existing power distribution system between a substation where a typical central control unit is located and each remote meter or control module not only as a transmission path, but also as a synchronization source. The invention advantageously incorporates fewer components at the remote meter and control modules than at the central control unit to help keep system costs down.

Utility meters are typically read periodically by a meter reader at the location of each customer who manually records each meter reading and returns the information concerning the date, location and reading to a central office. At the central office a keypuncher or other operator manually converts this data into a form for automatic processing by billing computers.

When meters are inside a building and no one is available to admit the meter reader, the meter reader does not record the reading for that period. The meter reader may leave a post card addressed to the utility instructing the customer to read the meter himself, write the reading on the postcard and mail the reading to the utility. Alternatively, the utility may estimate the use for that period based on past history. Both of these approaches are subject to inaccuracy. Moreover, even in systems where the meter is located outside and the meter reader always has access to it, manually obtaining and converting these readings for automatic processing is costly, time consuming and subject to error in each step between initial reading by the meter reader and automatic data processing for billing by the computer.

A number of automatic meter reading systems have been proposed. One approach involves the use of telephone lines to carry the data. Another comtemplates transceivers at each customer location with an aircraft flying over the area to interrogate transponders at each customer location through the transceivers. Still another approach contemplates the use of power lines for communicating data, but with costly links bypassing each distribution transformer. A disadvantage common to all these systems is high cost.

Utilities presently monitor the power flow on distribution lines at very few locations because of the high cost of telephone lines or limited radio-frequency channel allocation. Control elements such as switches are manually operated while power factor correction capacitors are operated by a clock rather than in response to load demands. When power outages occur because of breaks in the distribution line, utilities wait for customer telephone complaints to inform them of the affected area because they have no method of monitoring or controlling the distribution system in real time.

Utilities also have to provide generating capacity to meet the peak load demands, rather than the average or essential load. The present method of peak load shaving is to lower the distribution voltage, which is harmful to items such as computers and air conditioners, or in the extreme, to black out sections of their franchised area by interrupting service. It is a far better practice to shave peak load by interrupting service to non-essential power loads such as hot water heaters. This is presently accomplished by using time clocks, which lose time during power outages and therefore eventually do not remove the load during periods of maximum power consumption, or by general appeals to the public to turn off non-essential loads.

SUMMARY OF THE INVENTION

An important object of this invention is to provide an improved power line communication system.

It is another object of the invention to achieve the preceding object with a relatively economical digital data transmission system in which the existing power transmission system is used not only as transmission paths but also as a source of synchronizing signals locally available at each station.

It is another object of the invention to achieve one or more of the preceding objects in a system where equipment specifications at the numerous meter or control module locations may be relaxed relative to those at the many fewer central control units to keep system costs down while maintaining a reliable exchange of data at reasonable transmission rates.

It is a further object of the invention to achieve one or more of the preceding objects with a system capable of discriminating between desired and undesired signals.

It is still a further object of the invention to achieve one or more of the preceding objects with a system incorporating a logic arrangement facilitating reliable communication at relatively low costs.

It is another object of the invention to achieve one or more of the preceding objects while automatically reading meters at many remote locations and accurately transmitting these readings to a central billing location.

It is another object of the invention to achieve one or more of the preceding objects while automatically controlling elements of the power distribution system at many locations and accurately transmitting the status of these elements to a central operations control location.

It is another object of the invention to achieve one or more of the preceding objects while providing a means of rapid peak load shaving by interrupting service to non-essential loads.

It is another object of the invention to achieve one or more of the preceding objects while providing a means for metering power consumption during peak demand hours.

BRIEF DESCRIPTION OF THE DRAWING

Numerous other features, objects and advantages of the invention will become apparent from the following specification when read in connection with the accompanying drawing in which:

FIGS. 9A and 9B are schematic circuit diagrams of power factor correction capacitors with series and parallel isolation networks, respectively;

FIG. 11 is a timing diagram illustrating typical modulator and demodulator timing signals provided by the system of FIG. 10B;

FIG. 13 is a timing diagram showing command cycle timing signal waveforms of the central control unit;

DESCRIPTION OF THE PREFERRED EMBODIMENTS

Figure 1:
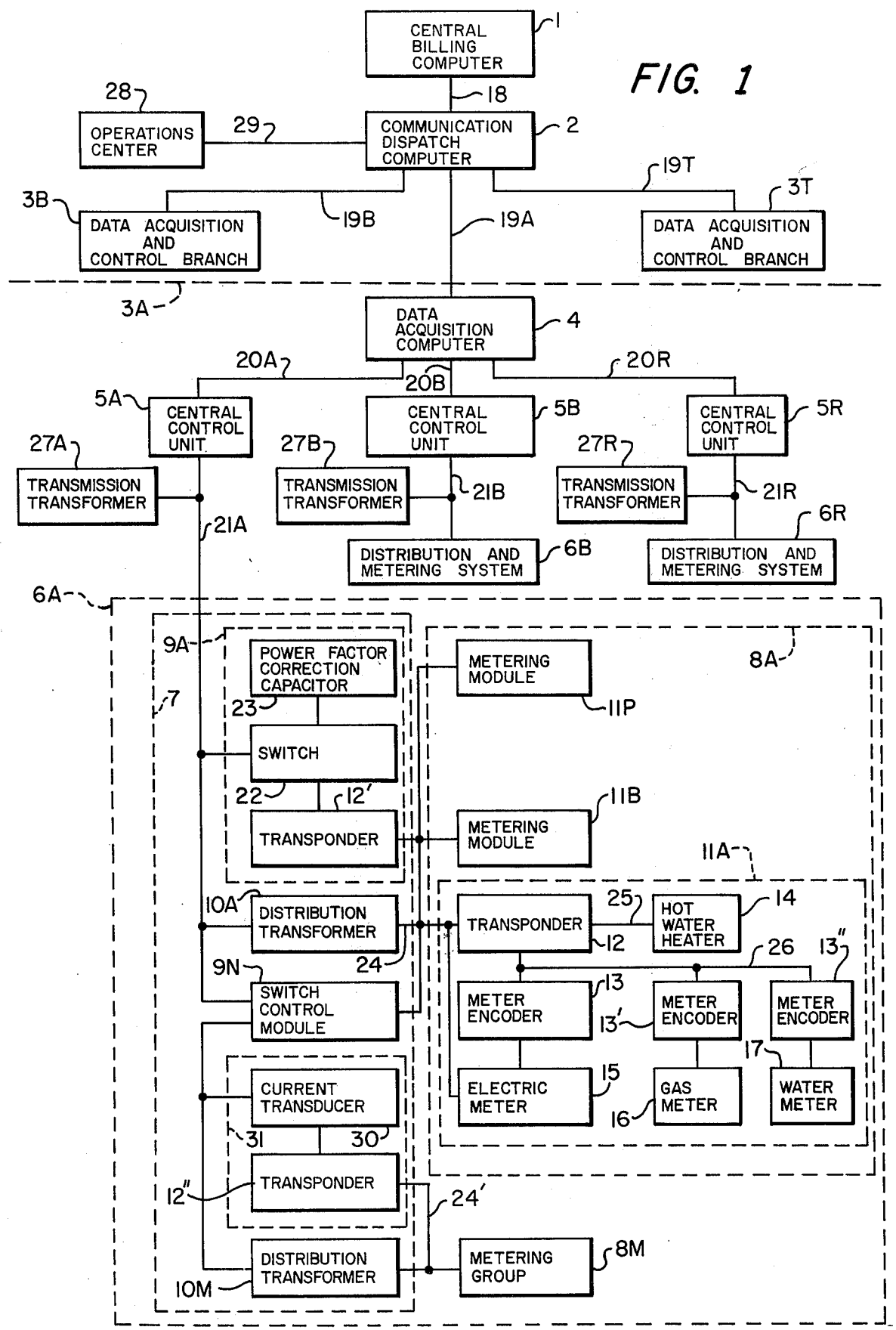
FIG. 1 is a block diagram illustrating the logical arrangement of a system according to the invention.

With reference now to the drawings and more particularly FIG. 1 thereof, there is shown a block diagram illustrating the logical arrangement of a system according to the invention. Where appropriate, corresponding elements are identified by the same reference symbol throughout the drawing. A central billing computer 1, which may be an IBM 360/95, prepares a data file containing information pertaining to each meter to be read or item to be controlled, with the data file sorted in a hierarchy according to data acquisition and control branch identification, central control unit identification, distribution feeder and phase identification, meter module identification, clock polarity identification, and meter type identification. The data file is then transmitted by high speed data link 18, which may be an interconnecting cable, to a communication dispatch computer 2, which may be a Data General NOVA 840. The communication dispatch computer 2 transmits the pertinent parts of the data file to a multiplicity of data-acquisition and control branches, such as 3A through 3T, via high speed data lines 19A through 19T, respectively, which may be telephone lines or microwave links. The data file is loaded into the data-acquisition computer controlling each branch, such as item 4 of branch 3A, which may be a Data General NOVA 2/10.

The data-acquisition and control branches, such as 3A, interface with a multiplicity of power distribution and metering systems, such as 6A through 6R, via a multiplicity of central control units, such as 5A through 5R, which receive data from data acquisition computer 4 via data links 20A through 20R, respectively. Based on the data file received from communication dispatch computer 2, data acquisition computer 4 sends data to a central control unit, such as 5A, via data link 20A, which may be a telephone line, microwave link or cable TV cable, identifying the distribution feeder and phase 21A that central control unit 5A should impress its output signal onto. Distribution feeder and phase 21A forms part of distribution network 7. Central control unit 5A signals data acquisition computer 4 when it has completed switching its output signal to the indicated distribution power feeder 21A. Data acquisition computer 4 then sends data to central control unit 5A instructing it which meter module, such as 11A, and meter type, such as 15, to interrogate, the clock polarity to be used for interrogation, and at what data rate meter module 11A should reply. Central control unit 5A impresses a modulated audio-frequency signal containing meter module address, meter type and reply data rate information on distribution feeder 21A. The signal travels along power distribution network 7, comprising power distribution feeder 21A, which may be a 3-phase, 12, 4 kilovolt feeder, and a multiplicity of distribution transformers, 10A through 10M, to a multiplicity of metering groups, 8A through 8 M. The multiplicity of all the meter modules, such as 11A through 11P, attached to the 240 or 120 volt, 60-Hz, distribution transformer secondaries, such as line 24 of distribution transformer 10A, receive the central control unit signal and their transponders, such as 12, demodulate and decode the signal. The transponder 12 whose locally-stored identification code matches that of the decoded signal obtains the meter reading of the designated meter, such as the electric meter 15, from a meter encoder, such as 13, via line 26. The transponder 12 then impresses on power distribution network 7, via line 24 and distribution transformer 10A, a modulated audio-frequency signal identifying the meter module (11A in example) and meter type (15 in the example), specifying the reply data rate, and giving the meter reading. The signal travels along power distribution network 7 to central control unit 5A, which demodulates the signal and sends the data to data acquisition computer 4 via data link 20A. Data acquisition computer 4 checks the data for errors and if any are found repeats the interrogation cycle at a lower reply baud rate. If no errors are found, data acquisition computer 4 stores the meter reading in a data file. After all assigned meters have been interrogated, it transmits the meter reading data to central billing computer 1 via data link 19, communication dispatch computer 2 and cable 18. In a similar manner, the system can also read gas meters, such as 16, and water meters, such as 17, by using meter encoders 13' and 13'', respectively.

Another feature of the invention is the ability to control the configuration of distribution network 7 by connecting or disconnecting power factor correction capacitors, such as 23, to or from distribution feeders, such as 21A, and by connecting or disconnecting distribution feeder switches, such as part of 9N. Operations center 28 signals a data acquisition and control branch, such as 3A, via data link 29, communication dispatch computer 2 and data link 19A, to connect or disconnect power factor correction capacitors, such as 23, to or from distribution feeder 21A. Data acquisition computer 4 selects the proper central control unit, such as 5A, and then sends data to it identifying the distribution feeder and phase, such as 21A, central control 5A should impress its output signal onto. Data acquisition computer 4 then sends data to central control unit 5A instructing it which control module, such as 9A, to command, the clock polarity to be used for interrogation, and at what baud rate control module 9A should reply with switch status. Central control unit 5A impresses a modulated audio frequency signal containing control module address, switch command and reply data rate information on distribution feeder 21A. The signal travels along power distribution network 7, through a multiplicity of distribution transformers, such as 10A through 10M, to a multiplicity of control modules, 9A through 9N, which receive the central control unit signal. Their transponders demodulate and decode the signal and the transponder, such as 12', whose identification code matches that of the decoded signal commands switch 22, which may be a General Electric Catalogue No. 178L793G51, to the desired state, thereby connecting or disconnecting power factor correction capacitor 23 to or from distribution feeder 21A. Transponder 12' then impresses a modulated audio-frequency signal containing the identification code of control module 9A, reply data rate and switch status on power distribution network 7, via line 24 and distribution transformer 10A. The signal travels along power distribution network 7 to central control unit 5A, which demodulates the signal and sends the data to data-acquisition computer 4 via data link 20A. Data acquisition computer 4 checks the data for errors and, if any are found, repeats the command cycle at a lower reply baud rate. If no errors are found, data acquisition computer 4 transmits the power factor correction capacitor switch status to operation center 28 via data link 19A, communication dispatch computer 2 and data link 29.

Another feature of the invention is the ability to shave peak load by disconnecting high-power-consumption devices such as electric hot-water heaters. Operation center 28 signals a data acquisition and control branch, such as 3A, via data link 29, communication dispatch computer 2 and data link 19A, to disconnect hot water heaters. Data acquisition computer 4 sends data to central control units 5A through 5R instructing them to interrogate all meter modules, such as 11A and 11B, by means of a given clock polarity hot water heater identification code and command code. Central control units 5A through 5R impress a modulated audio-frequency signal containing the hot water heater identification code and command code on distribution networks, such as 7. The signal travels along power distribution feeders, such as 21A, through a multiplicity of distribution transformers, such as 10A through 10M, to a multiplicity of meter modules, such as 11A through 11P. All the meter modules receive the central control unit signal, and the transponders, such as 12, using the same clock polarity as the transmitted signal correctly demodulate and decode the signal. All transponders contain the hot water identification code and command their associated hot water heaters, such as 14, to the state indicated by the command code. No reply is sent to the central control units in response to this message. In a similar manner data acquisition computer 4 then interrogates the meter modules using the inverse clock polarity. Thus, the peak load is shaved by a considerable amount in a very short period. The high power consumption devices such as hot water heaters, can be reconnected in a like manner. Alternatively, these devices can be reconnected after a preset interval by using a time-delay relay or similar device.

In a similar manner, the invention can be used for metering power consumption during the peak demand hours between 4 and 8 P.M. A second meter encoder, or similar device, is provided at each metering location. At the start of the peak demand period the hot water identification code is transmitted to all meter modules, along with function code indicating the start of peak demand metering. The transponders, such as 12, receive the signal and command the peak demand meter encoder to log the power being consumed. At the end of the peak demand period the hot water identification code is transmitted to all meter modules, along with a function code indicating the end of peak demand metering. The transponders, such as 12, receive the signal and command the peak demand meter encoders to stop logging the power being consumed. Alternatively, the peak demand meter encoders can be commanded to stop logging power consumption by using a timer, time-delay relay or similar device. Each peak demand meter encoder can then be read monthly or bi-monthly as previously described.

Another feature of the invention is the ability to monitor the power distribution system operating parameters, such as current flow, voltage amplitude and switch status. A transducer, such as current transducer 30, produces a digital signal that is proportional to the current flow through distribution feeder 21A. When a measurement of the current flow in distribution feeder 21A is desired, operations center 28 signals data acquisition computer 4 via data link 29, communication dispatch computer 2 and data link 19A. Data acquisition computer 4 sends data to central control unit 5A instructing it to impress its output signal onto power distribution feeder 21A. Data acquisition computer 4 then sends data to central control unit 5A instructing it to interrogate status module 31, the clock polarity to be used for interrogation, and at what baud rate status module 31 should reply. Central control unit 5A impresses a modulated audio-frequency signal containing status module address and reply baud rate information on distribution network 7, through a multiplicity of distribution transformers, such as 10A through 10M, to status module 31, where transponder 12″ demodulates and decodes the signal. Since the address of transponder 12″ matches the demodulated and decoded signal, it obtains the digital signal representing the current flow from current transducer 30. Transponder 12″ then impresses a modulated audio-frequency signal containing the identification code of the status module 31, reply baud rate and current flow information on power distribution feeder 21A via line 24′ and distribution transformer 10M. The signal travels along power distribution network 7 to central control unit 5A which demodulates the signal and sends the data to data acquisition computer 4 via data link 20A. Data acquisition computer 4 checks the data for errors and, if any are found, repeats the interrogation cycle with a lower reply baud rate. If no errors are found, data acquisition computer 4 transmits the current flow data to operation center 28 via data link 19A, communication dispatch computer 2 and data link 29.

The substations of the power distribution system are advantageous locations for central control units 5A through 5R. At this location the central control unit, such as 5A, has direct access to all distribution feeders and phases, such as 21A through 21R, emanating from transmission transformers. such as 27A through 27R, respectively, thereby allowing a single central control unit, such as 5A, to communicate with all meter modules, such as 11A through 11P, powered by the substation.

Figure 2:
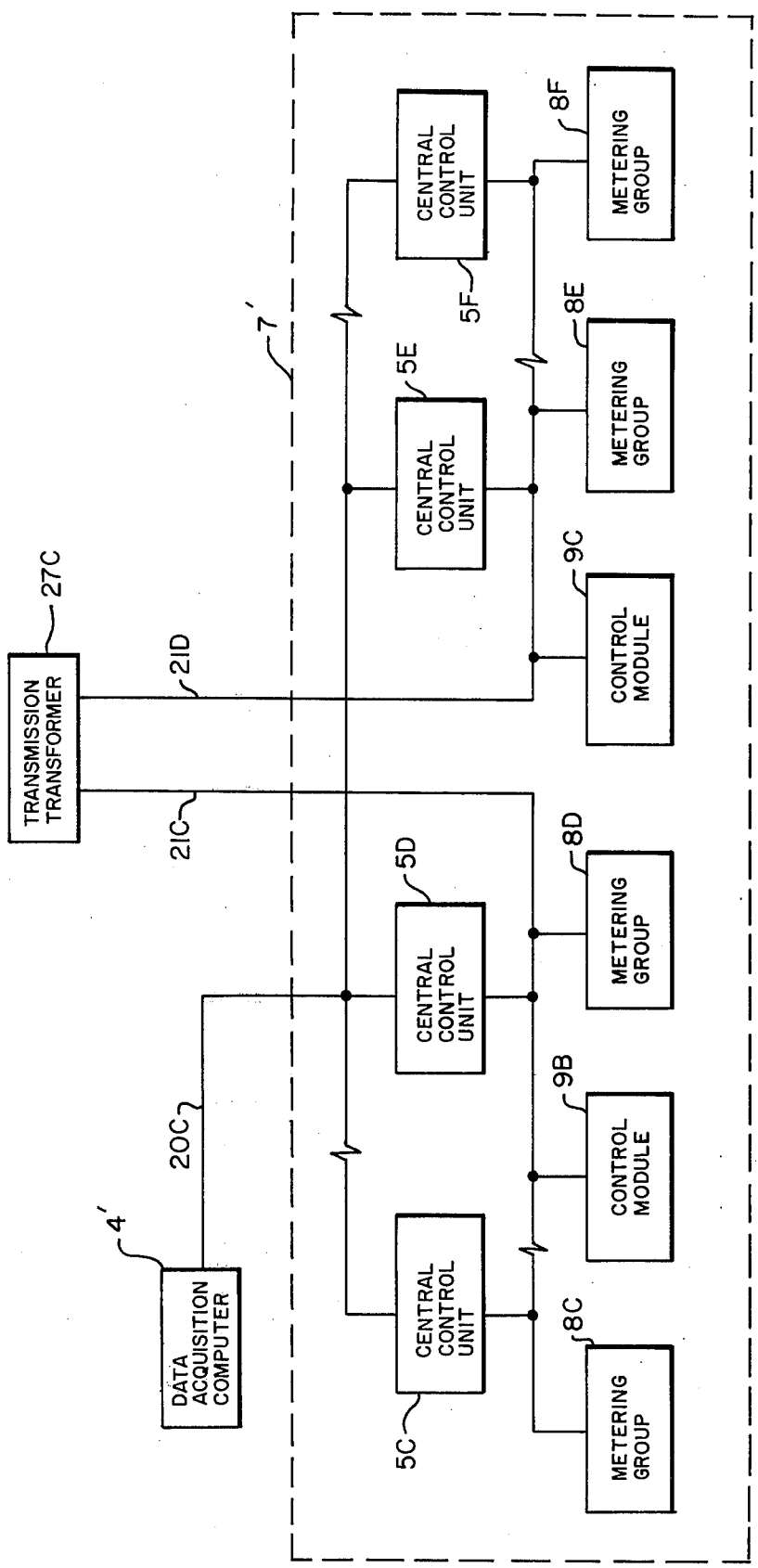
FIG. 2 is a block diagram illustrating the logical arrangement of a system according to the invention having a number of central control units at intervals along a power distribution network.

With reference to FIG. 2, it is also within the principles of the invention to locate central control units at intervals along distribution network 7′. With this arrangement data acquisition computer 4′ communicates with all central control units, such as 5C through 5F, simultaneously on a party line basis via data link 20C, which may be a telephone line. The data acquisition computer message contains a central control unit address code and only the central control unit that is addressed, such as 5C, responds to the message. Each central control unit such as 5C through 5F has to communicate with only one metering group, such as 8C through 8F, respectively, thereby reducing the output signal power requirements of the central control units. Communications with a control module, such as 9B, is assigned to a single central control unit, such as 5D.

Having briefly described the physical arrangement of the system, its operational techniques will now be described. Referring to FIGS. 3A–3G, there is shown the composition of the messages used to transfer data between data acquisition computer 4 and central control unit 5, and central control unit 5 and meter transponder 12. Data is transferred between data acquisition computer 4 and central control 5 at 285 baud using the 11 bit byte message format of FIG. 3A. Other baud rates and message formats may be used without departing from the principles of the invention. The signal is normally in the stop (logic 1) state and the start of a byte is delineated by a start (logic 0) bit. Eight bits of data are then transmitted with the end of a byte denoted by two stop bits.

Figure 3:
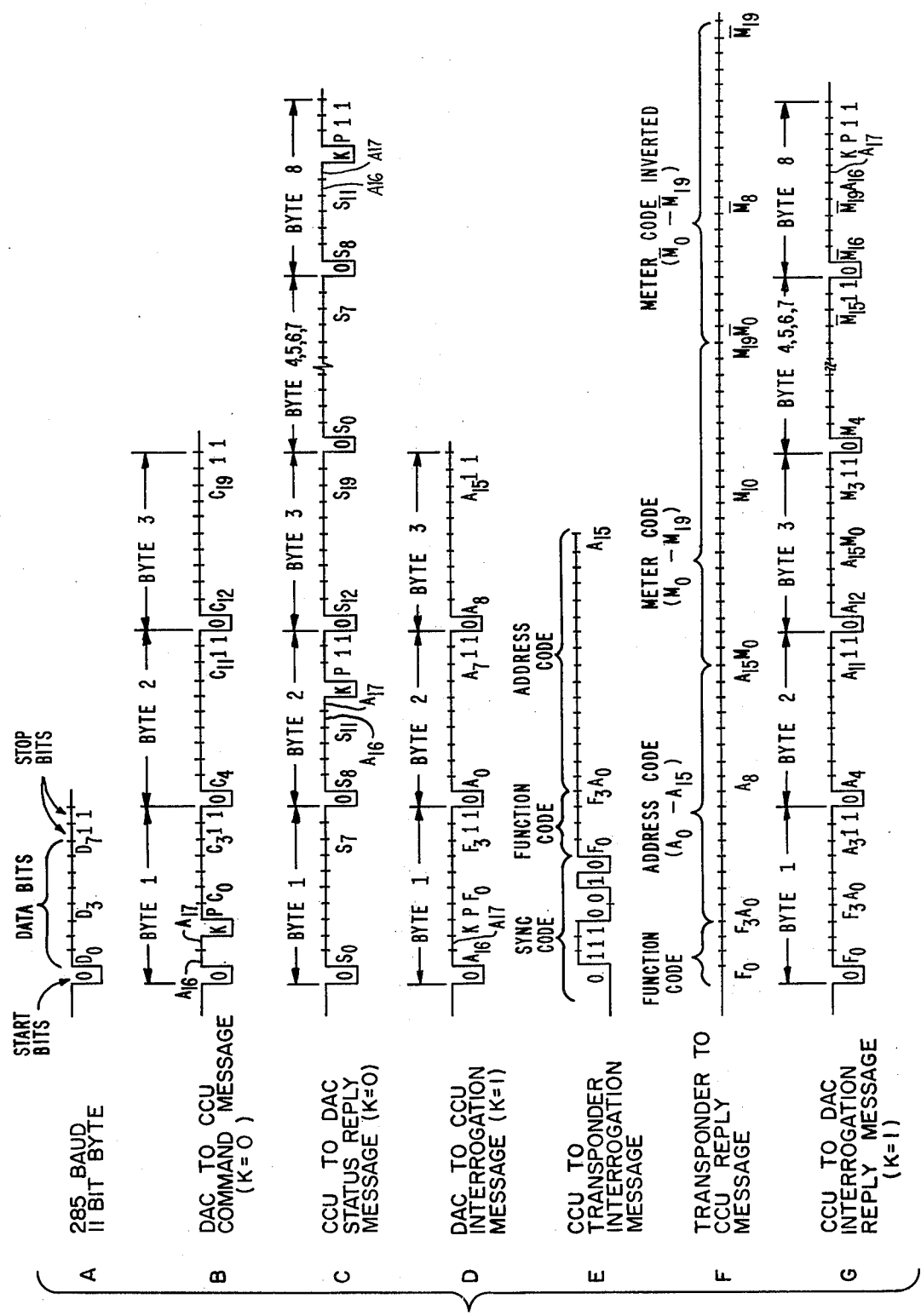
FIGS. 3A–3G graphically represent the composition of messages for transferring data between the data acquisition computer and central control unit and between the central control unit and the transponders.

Data acquisition computer 4 sends command messages to central control unit 5 controlling its configuration. These messages consist of three bytes as shown in FIG. 3B. The first byte contains the central control unit address bits, $A_{16}$ and $A_{17}$, the message mode indicator bit K, the command execute enable bit P and four of the command bits, $C_0$, $C_1$, $C_2$ and $C_3$. The next two bytes contain the remainder of the command bits, $C_4$ through $C_{19}$. The central control unit address bits are used to insure that only the proper central control unit responds to a command message, particularly when using the party line arrangement of FIG. 2. The message mode bit K is used to delineate between command and interrogation messages from data acquisition computer 4. When the message from data acquisition computer 4 is a command, bit P is interpreted as a command execute enable bit. If bit P is logic 1, the command message is executed while if bit P is logic 0, the command message is not executed, thereby enabling data acquisition computer 4 to obtain the configuration status of central control unit 5. FIG. 3B illustrates a message wherein bit K is logic 0, and bit P is logic 1; therefore, the message is a command to central control unit 5 and the command bits, $C_0$ through $C_{19}$, control the central control unit transmitter power and distribution feeder selection relays according to exemplary Table I.

TABLE I

| Command | Action |
| --- | --- |
| $C_0$ | Transmitter Power On |
| $C_1$ | Transmitter Power Off |
| $C_2$ | Feeder 1 Phase A Selector Relay On |
| $C_3$ | Feeder 1 Phase A Selector Relay Off |
| $C_4$ | Feeder 1 Phase B Selector Relay On |
| $C_5$ | Feeder 1 Phase B Selector Relay Off |
| $C_6$ | Feeder 1 Phase C Selector Relay On |
| $C_7$ | Feeder 1 Phase C Selector Relay Off |
| $C_8$ | Feeder 2 Phase A Selector Relay On |
| $C_9$ | Feeder 2 Phase A Selector Relay Off |
| $C_{10}$ | Feeder 2 Phase B Selector Relay On |
| $C_{11}$ | Feeder 2 Phase B Selector Relay Off |
| $C_{12}$ | Feeder 2 Phase C Selector Relay On |
| $C_{13}$ | Feeder 2 Phase C Selector Relay Off |
| $C_{14}$ | Feeder 3 Phase A Selector Relay Off |
| $C_{15}$ | Feeder 3 Phase A Selector Relay Off |
| $C_{16}$ | Feeder 3 Phase B Selector Relay On |
| $C_{17}$ | Feeder 3 Phase B Selector Relay Off |
| $C_{18}$ | Feeder 3 Phase C Selector Relay On |
| $C_{19}$ | Feeder 3 Phase C Selector Relay Off |

When the party line arrangement of FIG. 2 is used, it is advantageous to increase the number of central control unit address bits to allow more central control units to be used. The command bit field can be decreased correspondingly since the central control unit will only be switching among the three phases of a single distribution feeder.

After accomplishing the desired command central control unit 5 transmits its status to data acquisition computer 4 using the 8-byte message shown in FIG. 3C. Byte 1 contains status indicator bits $S_0$ through $S_7$, byte 2 contains status indicator bits $S_8$ through $S_{11}$, the central control unit address bits $A_{16}$ and $A_{17}$, the message mode indicator bit K, which is logic 0, and command execute bit P, and byte 3 contains the remaining status indicator bits $S_{12}$ through $S_{19}$. Bytes 4 and 7 repeat byte 1, bytes 5 and 8 repeat byte 2, and byte 6 repeats byte 3. Thus, the message is eight bytes in length, with the central control unit address and message mode indicator bits appearing at the end of the eighth byte. This makes central control unit 5 command reply message to data acquisition computer 4 compatible in byte count with that of an interrogation reply which will be discussed shortly.

Data acquisition computer 4 sends the three-byte message shown in FIG. 3D to central control unit 5 to initiate an interrogation cycle. The first byte contains the central control unit address bits $A_{16}$ and $A_{17}$, the message mode indicator bit K, which is a logic 1 denoting an interrogation message, bit P which controls the bit clock phase during an interrogation cycle, and the transponder function code bits, $F_0$ through $F_3$. The next two bytes contain the meter module, control module or hot water identification code bits, $A_0$ through $A_{15}$. The function code bits determine the control action and reply data rate. Table II below provides an exemplary meaning of each bit.

TABLE II

| Interrogation Type | Function Bit | State | Control Action |
|---|---|---|---|
| Meter | $F_0$ | 1 | Reply at 30 Baud |
| Meter | $F_0$ | 0 | Reply at 15 Baud |
| Meter | $F_1$ | 1 | Read Electric Meter |
| Meter | $F_2$ | 1 | Read Gas Meter |
| Meter | $F_3$ | 1 | Read Water Meter |
| Hot Water | $F_0$ | 1 | Time out at 30 Baud |
| Hot Water | $F_0$ | 0 | Time Out at 15 Baud |
| Hot Water | $F_1$ | 1 | Hot Water Heater On |
| Hot Water | $F_1$ | 0 | Hot Water Heater Off |
| Hot Water | $F_2$ | 1 | Start Peak Demand Meter |
| Hot Water | $F_2$ | 0 | Stop Peak Demand Meter |
| Control | $F_0$ | 1 | Reply at 30 Baud |
| Control | $F_0$ | 0 | Reply at 15 Baud |
| Control | $F_1$ | 1 | Connect Capacitor |
| Control | $F_1$ | 0 | Disconnect Capacitor |

Central control unit 5 sends the message shown in FIG. 3E to meter modules 11A through 11P, or control modules 9A through 9N, at 30 baud. The first eight bits are a fixed synchronization code which the transponders such as 12, detect and use to synchronize their data decoding. The next four bits are the function code, $F_0$ through $F_3$ and the last sixteen bits are the meter module identification code, $A_0$ through $A_{15}$. The designated meter or control module replies at the rate indicated by function code bit $F_0$ with the message format of FIG. 3F. Synchronization bits are not required since this message starts immediately after the completion of the central control unit 5 message, shown in FIG. 3E. The reply message repeats the four function code bits, $F_0$ through $F_3$, and the sixteen module identification code bits, $A_0$ through $A_{15}$, and includes twenty bits of meter data or control status, $\overline{M}_0$ through $\overline{M}_{19}$, and 20 bits of the one's complement of this data, $M_0$ through $M_{19}$. Other error detecting or correcting codes may be used for the data fields $M_0$ through $M_{19}$ and $\overline{M}_0$ through $\overline{M}_{19}$ without departing from the principles of the invention. The function code and module identification code bits are repeated to verify that the central control unit message of FIG. 3F was correctly received by the desired module while the meter or status data is repeated for transmission error detection since data accuracy is of the utmost importance.

Central control unit 5 then transmits the module reply to data acquisition computer 4 as eight bytes of data with the central control unit address bits, $A_{16}$ and $A_{17}$, message mode indicator bit K, which is logic 1 for this message and clock phase bit P added to the end of the message, as shown in FIG. 3G. When the party line arrangement of FIG. 2 is used, it is advantageous to increase the number of central control unit address bits. The number of module identification code bits can be correspondingly reduced since the number of meter and control modules each central control unit will have to interrogate will be reduced in proportion to the quantity of central units that are used.

Figure 4:
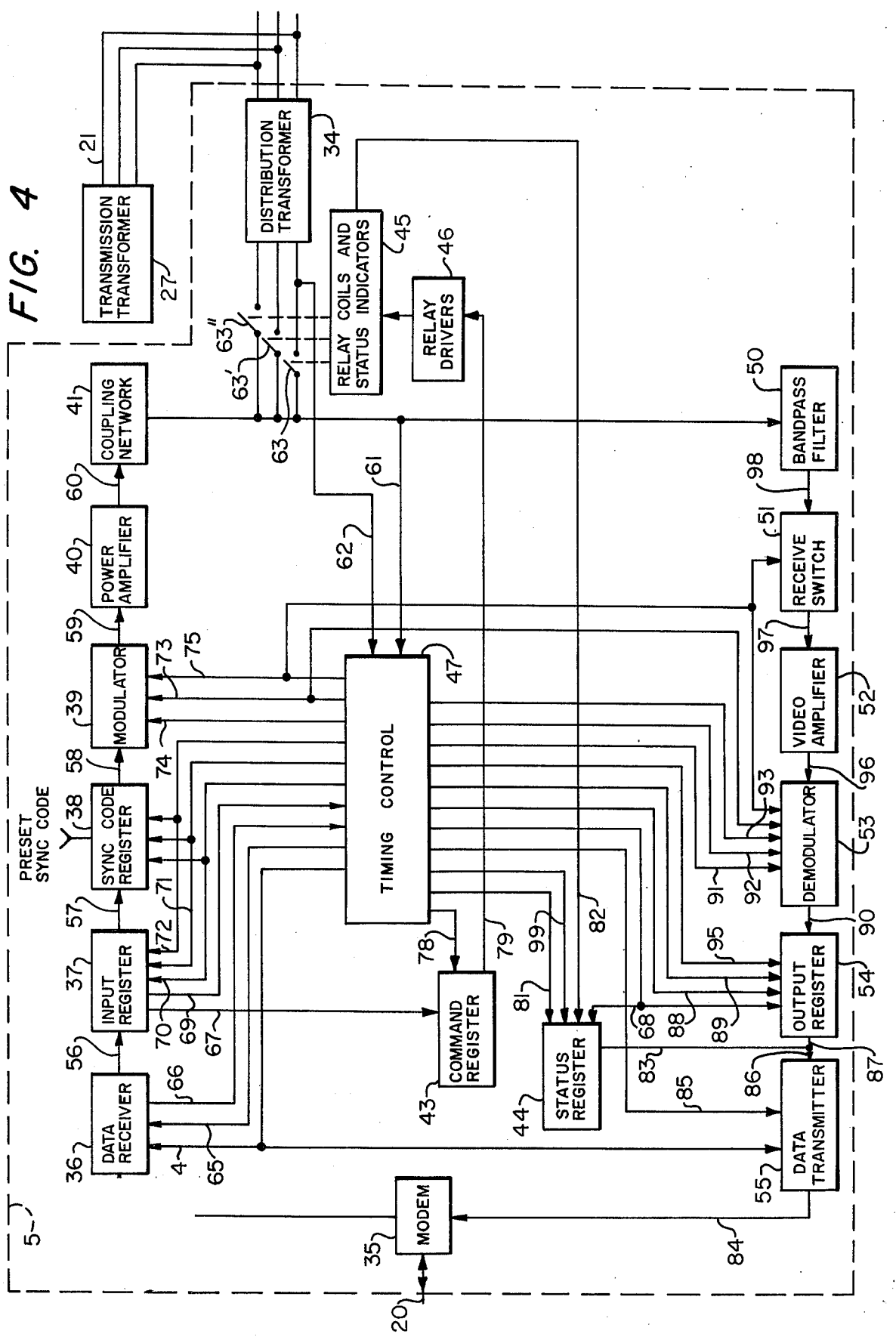
FIG. 4 is a block diagram illustrating the logical arrangement of a central control unit.

With reference to FIG. 4, the basic timing signal of the central control unit 5 is the nominal 120 volt, 60-Hz power line frequency obtained from the distribution feeder such as three phase feeder 21, via transformer 34 and line 62 or relay contacts 63, 63' or 63" and line 61. Initially relay contacts 63, 63' and 63" are open and timing control 47 utilizes the nominal 60-Hz power line frequency on line 62 to derive the 285 baud clock for communicating with data acquisition computer 4 and other clock and timing signals that will become apparent as the invention is further described. Central control unit 5 interfaces with modem 35, which may be a Bell System 103A data set, for communication with data acquisition computer 4 over 285 baud data link 20. The digital data received by modem 35 from data acquisition computer 4 is sent to data receiver 36, which may be part of asynchronous data interface TMS 6011 by Texas Instruments, which strips out the 8 data bits from the 11-bit byte of FIG. 3A and signals timing control 47, via line 66, that a byte has been received. Timing control 47 issues a signal via line 70 that loads the data from data receiver 36 into input register 37 and a reset signal to data receiver 36 via line 65. After timing control 47 counts three signals from line 66, it interrogates the first 5 bits of input register 37, via line 69. If the central control unit address bits A16 and A17 are correct, message mode indicator bit K indicates the contents of input register 37 are a command and bit P indicates the command should be executed, timing control 47 issues a signal, via line 78, that loads the command bits $C_0$ through $C_{19}$ of input register 37 into command register 43, which enables the commanded relay driver, part of 46, which in turn energizes the commanded relay coil and indicator, part of 45, thereby closing relay contacts 63, 63' or 63", which automatically switches the 60-Hz power line frequency source used by timing control 47 from line 62 to line 61. The status indicators, part of 45, send a signal to the status register 44, via line 82, indicating which relay is energized. Bit P is also loaded into status register 44 via line 68. Timing control 47 waits a preset interval after strobing the data into command register 43 for relay switching and status indication to take place and then loads the contents of status register 44 into data transmitter 55 via line 83, using shift mode, shift clock and transmit data control signals on lines 81, 99 and 85, respectively. Data transmitter 55 which may be part of asynchronous data interface TMS 6011 by Texas Instruments, inserts the start and stop bits to form the 11-bit byte, shown in FIG. 3A, which is then sent to data acquisition computer 4 via modem 35 and data link 20. If bit P indicates command execution should not take place, command bits $C_0$ through $C_{19}$ of input register 37 are not loaded into command register 43 and the command cycle times out as previously explained, thereby transmitting the pre-existing configuration of central control unit 5 to data acquisition computer 4.

If the message mode indicator bit K is logic 1, indicating the contents of input register 37 are interrogation data, timing control 47 loads the preset synchronization code into sync code register 38 using a control signal on line 72, selects the correct clock phase using bit P, and then shifts the contents of sync code register 38 and input register 37 to modulator 39 using the shift clock on line 70. The input to modulator 39 modulates a carrier received from timing control 47 on line 73. The output of modulator 39 is amplified by power amplifier 40, which may be a Bogen model NTB-250, and is impressed on 120V, 60-Hz line 61 by coupling network 41, which is a series capacitor and inductor tuned to resonate with the impedance of line 61 at the communication carrier frequency. The transmitted signal then flows through relay contacts 63, 63', or 63" and distribution transformer 34 to distribution feeder 21 and then to all the meter and control modules, 11 and 9, respectively, attached to the distribution feeder 21. During this interval modulator 39 is enabled, and receive switch 51 is inhibited by the transmit enable signal from timing control 47 on line 75.

At the completion of the central control unit 5 transmission period, modulator 39 is inhibited, and receive switch 51 is enabled, by the transmit enable signal from timing control 47 on line 75. The meter or control module reply signal on distribution feeder 21 flows through distribution transformer 34, relay contacts 63, 63' or 63", line 62, bandpass filter 50, which may have a Q of 20, receive switch 51, which may be an RCA CD4066A, and video amplifier 52, which may be a Fairchild Semiconductor 741 operational amplifier, to demodulator 53.

Demodulator 53 uses a reference frequency and function code bit $F_0$ received from timing control 47 on lines 73 and 91, respectively, to obtain the data contained in the received signal. Timing control 47 uses the meter or control module reply baud rate information contained in function code bit $F_0$ to determine the baud rate at which data is being received by central control unit 5. At the end of each baud interval the output of demodulator 53 is shifted into output register 54 by a shift clock on line 89, generated by timing control 47. After the entire reply message is received, the first 8 bits of output register 54 are transferred to data transmitter 55, and the central control unit address bits $A_{16}$ and $A_{17}$, message mode indicator bit K and clock phase bit P are loaded into output register 54 by control signals from timing control 47 on lines 85 and 95, respectively. Data transmitter 55 inserts the start and stop bits to form the 11 bit byte shown in FIG. 3A and transmits the byte to data acquisition computer 4 at 285 baud, via modem 35 and data link 20. Timing control 47 continues to shift the data in output register 54 and transfer the data from output register 54 into data transmitter 55 until the entire meter or control module reply message contained in output register 54 is transmitted to data acquisition computer 4.

The central control units, such as 5, and transponders, such as 12, both use the 60-Hz power distribution frequency to clock their timing control circuits. However, due to the random phasing of the distribution transformers, such as 10A through 10M, the 60-Hz polarity at any transponder may be inverted with respect to the 60-Hz polarity at central control unit 5. The phasing of the 60-Hz signal in each transponder can be adjusted at time of installation but this is a time consuming and, therefore, prohibitively expensive process to be performed at each transponder. The preferred method is to install each transponder without adjustment and then use the data acquisition computers, such as 4, to interrogate each transponder while adjusting the 60-Hz polarity at central control unit 5. When the 60-Hz polarity used for interrogation timing by central control unit 5 is identical with that at the transponder being interrogated, the transponder will reply correctly. In this manner the correct 60-Hz polarity to be used for interrogating each transponder can be found and stored in the master data files at central billing computer 1. The correct 60-Hz polarity is then transmitted to each data acquisition computer, such as 4, as bit P whenever a transponder, such as 12, is to be interrogated.

Figure 5:
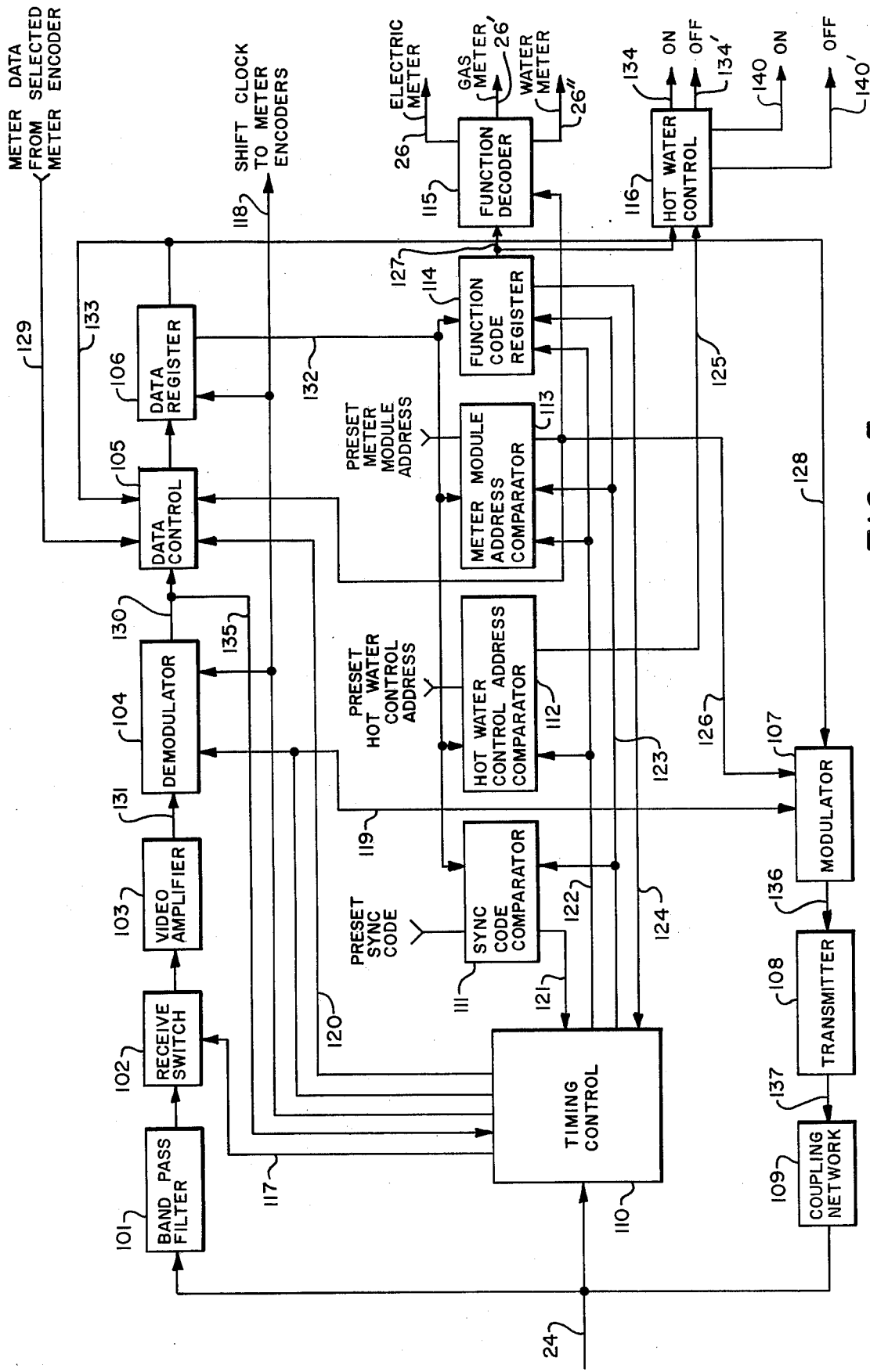
FIG. 5 is a block diagram illustrating the logical arrangement of a transponder.

With reference to FIG. 5, there is shown a block diagram illustrating the logical arrangement of transponder 12. The basic timing signal of transponder 12 is the nominal 120 volt, 60-Hz power distribution frequency obtained from distribution transformer secondary, line 24. Timing control 110 utilizes the nominal 60-Hz power distribution frequency on line 24 to derive the various clocks and control signals needed to control the flow of data in transponder 12. The signal from central control unit 5 flows through bandpass filter 101 which has a Q of about 5, receive switch 102, which may be RCA CD4066A, video amplifier 103, which may be a Fairchild Semiconductor 741 operational amplifier, to demodulator 104. Demodulator 104 uses the reference frequency from timing control 110, on line 119, to obtain the data contained in the signal received from central control unit 5. The demodulator output on line 135 is used by timing control 110 to control the phase of the reference frequency on line 119.

At the end of each data interval timing control 110 uses the shift clock on line 118 to shift the received data bit from demodulator 104 into data register 106 via data control 105. At the beginning of each bit period the first eight bits of data register 106, carried by part of line 132, are compared to the preset synchronization code by synchronization code comparator 111. When these are identical, a signal is sent to timing control 110, via line 121, which starts a bit counter. After 20 more bits have been received and shifted into data register 106, the first 16 bits of data register, carried by part of line 132, are compared to the preset meter module address and hot water control address by comparators 113 and 112, respectively, the last four bits of data register 106, carried by part of line 132, are transferred to function code register 114, and receive switch 102 is inhibited. The shift clock on line 118 assumes the frequency indicated by function code bit $F_0$ on line 124.

If meter module address comparator 113 detects a match, function decoder 115, modulator 107 and the meter data input to data control 105 are all enabled via line 126. The meter module address and function code contents of data register 106 are shifted to distribution transformer secondary 24 via line 128, modulator 107, transmitter 108 and coupling network 109, while the contents of the meter encoder that is enabled by function decoder 115, such as the electric meter encoder via line 26, are shifted into data register 106 via line 129 and data control 105. After the 20 meter data bits, are shifted into data register 106, its contents are recirculated via line 133 and data control 105, which logically inverts the meter data. Data recirculation through data control 105 is enabled by timing control 110 enable signal on line 120. After the 60-bit reply message has been transmitted, receive switch 102 is enabled via line 117, and sync code and meter module address comparators, 111 and 113, respectively, are reset via line 123, thereby inhibiting modulator 107, meter data inputs to data control 105 and resetting function decoder 115. Transponder 12 then resumes searching the received data for a synchronization code match.

If hot water control address comparator 112 detects a match after a synchronization code match is detected, the function code bits carried by line 127 are strobed into hot water control 116, thereby turning the hot water heater on via line 134 or off via line 134', or controlling the peak demand meter via lines 140 and 140'. Modulator 107 is not enabled since no reply message is to be transmitted. After a period of time equal to that needed for a reply at the rate indicated by function code bit $F_0$ on line 124, receive switch 102 is enabled via line 117, and synchronization code comparator 111 is reset via line 123. Hot water control 116 is not reset, thereby enabling the control function to be maintained until a further hot water control instruction is received. Transponder 12 then resumes searching the received data for a synchronization code match.

If neither a meter module address nor hot water control address is detected by comparators 113 and 112, respectively, after a synchronization code match is detected by comparator 111, no control action is initiated nor reply transmitted. Timing control 110 waits a period of time equal to that needed for a reply at the rate indicated by function code bit $F_0$ on line 124, then enables receive switch 102, via line 117, and resets synchronization code comparator 111 via line 123.

Figure 6:
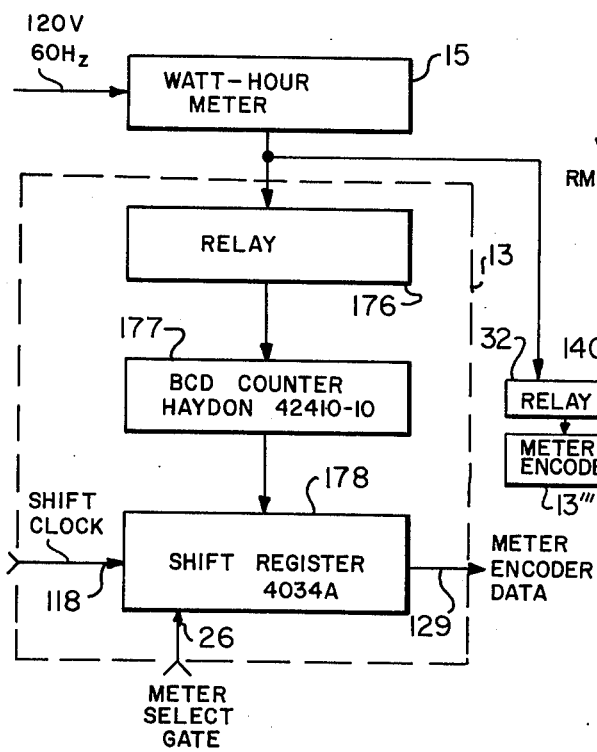
FIG. 6 is a block diagram illustrating the logical arrangement of a meter encoder.

An exemplary electric meter 15 and encoder 13 are shown in FIG. 6. The electric watt-hour meter 15, such as General Electric Co. Model No. 150S, drives revolution contactor, such as General Electric Co. Model R12/125, which drives relay 176, such as General Electric Co. Model 731X2G6, whose contacts close for a short period of time after each 100 watt-hours of consumption has been logged by watt-hour meter 175. The relay contact closure increments counter 177, which may consist of 4 binary coded decimal counter stages, such as Hayden Switch Model 42410-10. The parallel outputs of counter 177 are connected to the parallel inputs of shift register 178, which may consist of parallel input serial output shift register stages, such as RCA CD4034A. When a meter transponder is not being interrogated the meter select signal, line 26, inhibits the A bus and serial operation of shift register 178, thereby allowing the parallel outputs of counter 177 to continuously update the contents of shift register 178. During a meter transponder interrogation the meter select signal, line 26, enables the A bus and serial mode of operation, thereby allowing the contents of shift register 178 to be shifted to meter transponder 12, via line 129, in a serial manner in response to the shift clock transitions on line 118. It is preferred that encoder 13 include a non-volatile memory element, such as Hayden Switch Model 42410-10, to avoid the loss of meter data in the event of power failure. Furthermore, while the Hayden Switch Model 42410-10 has 4 BCD stages it is obvious that a fifth stage can be added; that is preferably, since many utilities are up-grading their meter equipment to 5-dial meters.

When peak demand metering is desired, another meter encoder, such as 13''', can be connected to the same power meter with the signal from watt-hour meter 15 connected to meter encoder 13''' through relay 32 which is controlled by transponder 12. When it is desired to log power consumption on the peak demand meter encoder, relay 32 contacts are commanded closed via line 140 from transponder 12. When it is desired to stop logging power consumption on the peak demand meter relay 32, contacts are commanded open via line 140' from transponder 12.

Figure 7:
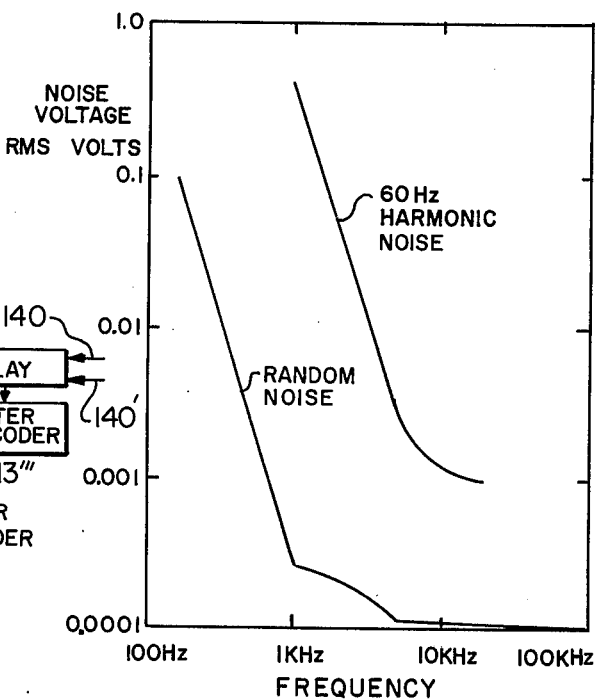
FIG. 7 is a graphical representation of spectral noise as a function of frequency typically encountered on a 120 volt power line.

FIG. 7 illustrates the typical noise that is present on a power distribution feeder, such as 21 of FIG. 1, and shows that the amplitude envelope of the 60-Hz power distribution frequency harmonics is about 1000 times larger than random noise between 1 and 10 kHz. This would suggest a communication carrier frequency selection in the low noise region above 10 kHz.

Figure 8A:
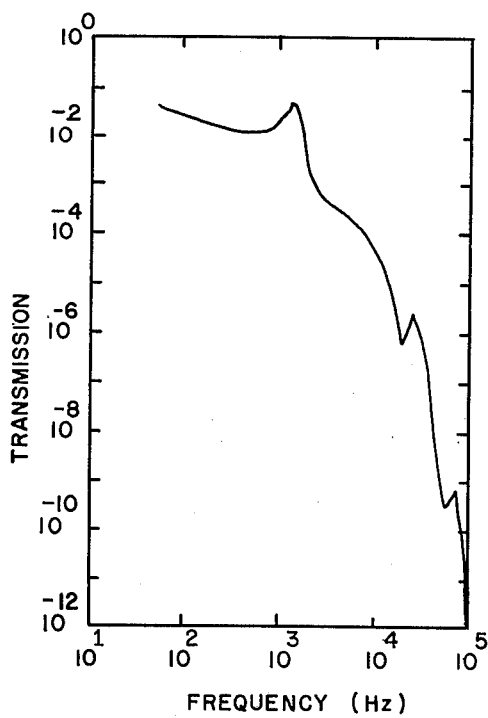
FIGS. 8A and 8B are graphical representations of transmission as a function of frequency in an actual installation according to the invention.
Figure 8B:
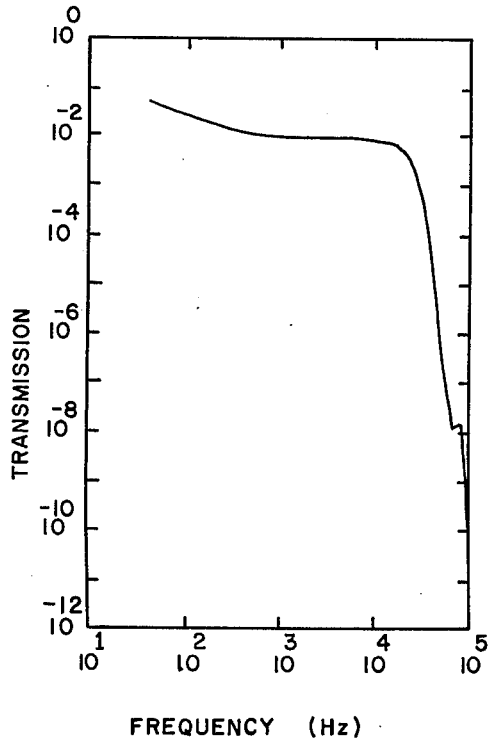

However, most distribution feeders have power factor correction capacitors connected to them to enable the utility to meet economic and quality-of-service constraints. Furthermore, the distribution feeders have series inductance and stray capacitance to ground, the exact values of which depend on distribution feeder construction and length. Therefore, distribution feeders have a low pass transmission characteristic as a result of these reactive components. A network analysis, confirmed by distribution feeder signal transmission measurements, shows the half-power cutoff frequency to lie at about 1 kHz when the power factor correction capacitors are connected to a typical distribution feeder; this is illustrated in FIG. 8A. When the power factor correction capacitors are disconnected from the distribution feeder, the half-power cutoff frequency is determined by the distribution feeder series inductance and stray capacitance to ground and lies between 10 and 20 kHz as illustrated in FIG. 8B. Furthermore, a remote meter reading and control system will consist of a large quantity of meter and control modules located throughout a power utility's franchised service area, and it is imperative that these units be low-cost. Economic factors preclude the use of high-power, high-frequency transistors and highly-selective filters. Therefore, it is advantageous to select a communication carrier frequency in the range between 5 and 10 kHz so the system will operate in the region of low harmonic noise and low signal transmission loss, and to utilize a technique for communicating between central control unit 5 and meter module 11 or control module 9 that will discriminate against the 60-Hz power distribution frequency harmonics.

In order to operate the system in range between 5 and 10 kHz, it is necessary to overcome the deleterious effects of the power factor correction capacitors. The preferred method is to insert a capacitor isolation network in series with each power factor correction capacitor as shown in FIG. 9A, or in parallel with each power factor correction capacitor as shown in FIG. 9B. With reference to FIG. 9A, the capacitor isolation network, consisting of inductor 32 and capacitor 33, is inserted in series with power factor correction capacitor 23'. Inductor 32 and capacitor 33 are tuned to anti-resonance at the communication carrier frequency. Line 21A' is the high voltage distribution feeder, and line 21A'' is the distribution feeder neutral.

With reference to FIG. 9B, the capacitor isolation network, consisting of inductor 32' and capacitor 33', is installed in parallel with power factor correction capacitor 23''. Inductor 32' is tuned to anti-resonance with the parallel combination of capacitors 33' and 23'' at the communication carrier frequency.

An alternative method of overcoming the effects of power factor corresponding capacitors on signal transmission consists of signalling the control modules, such as 9A, to disconnect the capacitor.

An advantageous communication technique is phase shift keying since a unique choice of parameters enables this method to act as a highly-selective filter and discriminate against the 60-Hz power distribution frequency harmonics. This technique is incorporated in the preferred embodiment, wherein the received communication carrier signal is demodulated by a phase detector whose output is integrated for a period of time T corresponding to one baud and then reset.

The integrator output $E_o$ at the end of the integration period T represents the received energy detected by the system during the period T and can be written as:

$$E_o = \int_o^T e_{in}(t) \cdot e_{ref}(t) \, dt \quad (1)$$

where the demodulator reference signal $e_{ref}(t)$ can be written as:

$$e_{ref}(t) = A_r \cdot \sin \omega_r t$$

The phase detector input $e_{in}(t)$ consists of the communication carrier signal $e_c(t)$, each power distribution frequency harmonic $e_{hp}(t)$ and random noise $e_n(t)$ of uniform energy spectral density $N_o/2$ watts per Hz where each of these can be written as:

$$e_c(t) = A_c \sin(\omega_c t + \phi_c) \quad (2)$$

$$e_{hp}(t) = A_{hp} \sin(\omega_{hp} t + \phi_h) \quad (3)$$

The demodulator reference frequency is identical to the communication carrier, so the detected energy for this signal is written as:

$$E_{oc} = \frac{A_r A_c T}{2} \cdot \cos \phi_c \quad (4)$$

By phase locking the reference frequency to the received communication carrier signal the phase difference between the two signals $\phi_c$ can be made arbitrarily small, and the detected energy can be made to approach the maximum value of $A_r A_c T/2$. The detected energy in response to a power distribution frequency harmonic $e_{hp}(t)$ can be written as:

$$E_{ohp} = \frac{A_r A_{hp} T}{2} \left[ \frac{\sin[(\omega_r - \omega_{hp})T - \phi_{hp}] + \sin \phi_{hp}}{(\omega_r - \omega_{hp})T} - \frac{\sin[(\omega_r + \omega_{hp})T + \phi_{hp}] - \sin \phi_{hp}}{(\omega_r + \omega_{hp})T} \right] \quad (5)$$

where $\omega_{hp} = 2\pi(60P)$ and P is an integer defining the power distribution frequency harmonic under consideration. In the preferred embodiment the communication carrier frequency is selected to be an odd multiple of 30-Hz, half the power distribution frequency. The demodulator reference frequency can then be written as:

$$\omega_r = 2\pi(2m+1)30 \quad (6)$$

where $m$ is an integer defining the odd multiple of 30-Hz used for data communication. It is also advantageous to select baud rates that are sub-multiples of the power distribution frequency, such as 30 or 15-baud, corresponding to integration periods T of 1/30 of 1/15 seconds, respectively. For this unique selection of parameters the detected energy $E_{ohp}$ is exactly equal to zero for any value of P and $\phi_{hp}$, thereby discriminating against the 60-Hz power distribution frequency harmonics. If a 60-baud rate is selected, corresponding to an integration period T of 1/60 second, the detected energy $E_{ohp}$ can be written as:

$$E_{ohp} = \frac{A_r A_{hp} \sin \phi_{hp}}{30\pi (2m-1)} \left[ 1 - \left( \frac{2p}{2m+1} \right)^2 \right]^{-1} \quad (7)$$

For this case the phase detector-integrator demodulator acts as a bandpass filter centered on the communication carrier frequency discriminating against the 60-Hz harmonics to the extent each harmonic is separated from the communication carrier; i.e., that 2P is greater than 2m+1, and can totally discriminate against a harmonic if $\phi_{hp}$ is an integral multiple of $v$ radians.

With respect to the random noise $e_n(t)$ the integrator acts as a low-pass filter and discriminates against the random noise components that are outside the signal bandwidth. Therefore, the average detected power due to random noise can be written as:

$$P_{on} = \frac{E_{on}}{T} = \frac{A_r N_o}{2T} \quad (8)$$

The signal-to-noise ratio at the integrator output for data rates that are sub-multiples of 60-baud, such as 30 or 15 baud, is obtained by comparing the signal power to noise power and can be written as:

$$SNR = \frac{A_c T \cos \phi_c}{N_o} \quad (9)$$

which increases as the baud rate decreases, thereby decreasing the probability of bit error. For a 60-baud data rate the 60-Hz harmonic noise power is much larger than the random noise power and the signal-to-noise ratio can be written as:

$$SNR = \left[ \frac{A_c \cos \phi_c}{\sum_{P=P_u}^{P=P_L} \frac{4A_{hp} \sin \phi_{hp}}{\pi (2m+1)}} \right] \left[ 1 - \left[ \frac{2P}{2m+1} \right]^2 \right] \quad (10)$$

where $P_u$ and $P_L$ are defined by the upper and lower cutoff frequencies of the frequency selective filter that precedes the demodulator.

While expression 10 is smaller than expression 9, a 60-baud data rate is advantageous to use in situations where a 60-baud throughput is desired and the resulting bit error probabilities are acceptable.

The odd harmonics of the power distribution frequency have been measured to be 10 to 100 times larger in amplitude than the even harmonics, thus, another advantageous selection of communication carrier frequency is an even harmonic of the power distribution frequency. The demodulator reference frequency can then be written as:

$$\omega_r = 2\pi(2Q)60 \qquad (11)$$

where $Q$ is an integer defining the even multiple of 60-Hz used for data communication. The detected energy in response to the communication carrier is identical with expression 4. The power distribution frequency harmonic at the communication carrier frequency can be written as:

$$E_{hc}(t) = A_{hc} \sin(\omega_r t + \phi_{hc}) \qquad (12)$$

and the detected energy in response to this harmonic can be written as:

$$E_{ohc} = \frac{A_r A_{hc} T}{2} \cdot \cos \phi_{hc} \qquad (13)$$

The detected energy $E_{ohp}$ in response to any other harmonic of the power distribution frequency is given by expression (5) and is exactly equal to zero for any value of $P$ and $\phi_{hp}$, thereby discriminating against these harmonics. Since the signal power of the power distribution harmonic at the communication carrier frequency is much larger than the random noise power, the signal to noise ratio can be written as:

$$SNR = \frac{A_c \cos \phi_c}{A_{hc} \cos \phi_{hc}} \qquad (14)$$

and is independent of baud rate. Expression 14 may be smaller then expression 19, thereby yielding a higher probability of bit error. However, the set of parameters defined by expressions 11 through 14 are advantageous to use in situations where a 60 baud data throughput is desired and the resulting bit error probabilities are acceptable.

It is also within the principles of the invention to use other communication techniques such as frequency shift keying or amplitude modulation.

In the preferred embodiment of the invention central control unit 5 transmits data to meter module 11 and control module 9 at 30 baud, and the modules reply at 30 or 15 baud. However, in situations where higher bit error probabilities are acceptable and higher data throughputs are desired, it is advantageous to have central control unit 5 transmit data to meter module 11 and control module 9 at 60 baud, and the modules reply at 60, 30 or 15 baud. For this situation central control unit 5 transmitter output power may have to be increased to obtain acceptable error rates and an odd harmonic of 30 Hz, defined by expression 6, should be used for the communication carrier frequency, thereby permitting central control unit 5 demodulator to discriminate against the power frequency harmonies when the modules are replying at 30 or 15 baud.

Measurements on power distribution feeders have shown the power line frequency has variations as large as 3 percent from the nominal 60-Hz. Therefore, it is advantageous to derive the transmitter communication carrier, demodulation reference carrier and data bit timing from the power distribution frequency so the previously defined relationships between parameters remain constant and the demodulation results remain valid. Measurements on power distribution feeders have also shown the communication carrier phase can vary more than 50° in a 6 minute period. Therefore, it is advantageous to phase lock the various demodulator reference oscillators to a signal obtained from the unit that is transmitting.

The preferred embodiment incorporates the principles developed above to eliminate the need for costly items, such as highly selective filters and high power transmitters in the transponders. Referring again to FIG. 1, between interrogations of meter module 11 or control module 9 central control unit 5 transmits a pilot tone, an unmodulated communication carrier, with sufficient signal strength to be detected by all transponders 12 connected to distribution feeder 21 being driven by the central control unit 5 transmitter. The transponders 12 connected to distribution feeder 21 receive the pilot tone and phase lock their reference carrier oscillators to this central control unit 5 signal, thereby making the previously defined phase angle $\phi_c$ arbitrarily small. After a period of time, sufficient for all transponder 12 reference oscillators to have achieved phase lock, central control unit 5 transmits data to transponders 12 at a fixed rate of 30 baud by phase-shift modulating the communication carrier. It is advantageous to use a modulation deviation of +90° to represent a logic one and −90° to represent a logic zero as this deviation provides the least probability of bit error for a given signal-to-noise ratio. The transponder 12 that is interrogated replies at the instructed data rate, such as 30 or 15 bits per second. Transponders 12 do not transmit a pilot tone to central control unit 5, which instead demodulates the transponder transmission by using four parallel phase sensitive demodulators that have their reference carriers separated in phase by 45°. After receiving the first bit of transmission from transponder 12, central control unit 5 scans the four demodulator outputs and selects the demodulator output with the maximum absolute amplitude, and therefore, minimum phase angle separation $\phi_c$ from transponder 12 communication carrier. The demodulator polarity is obtained by comparing the received bit polarity with the expected polarity of the first bit, which is function code bit $F_0$. This demodulator polarity is used for detection of the remainder of the transponder transmission.

The ability to use different transponder bit rates permits the system to use low-power transponder transmitters and automatically adapt the transponder transmission communication channel to varying signal-to-noise ratios while obtaining maximum system data throughput.

Figure 10A:
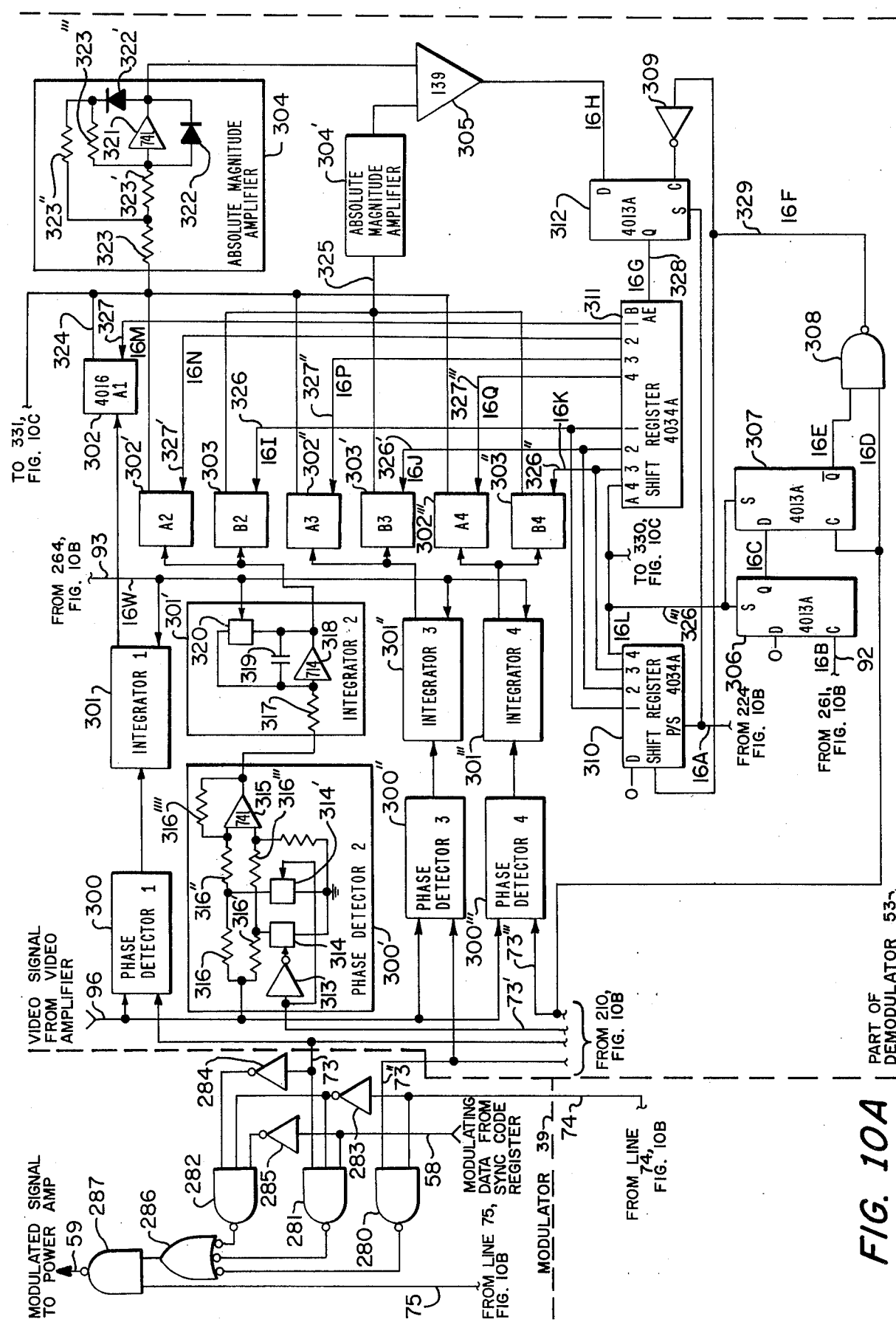
FIG. 10 shows the specific interconnections among integrated circuits forming the modulator, demodulator and timing control for the central control unit; and is set forth on three sheets designated FIGS. 10A, 10B and 10C, respectively.
Figure 10B:
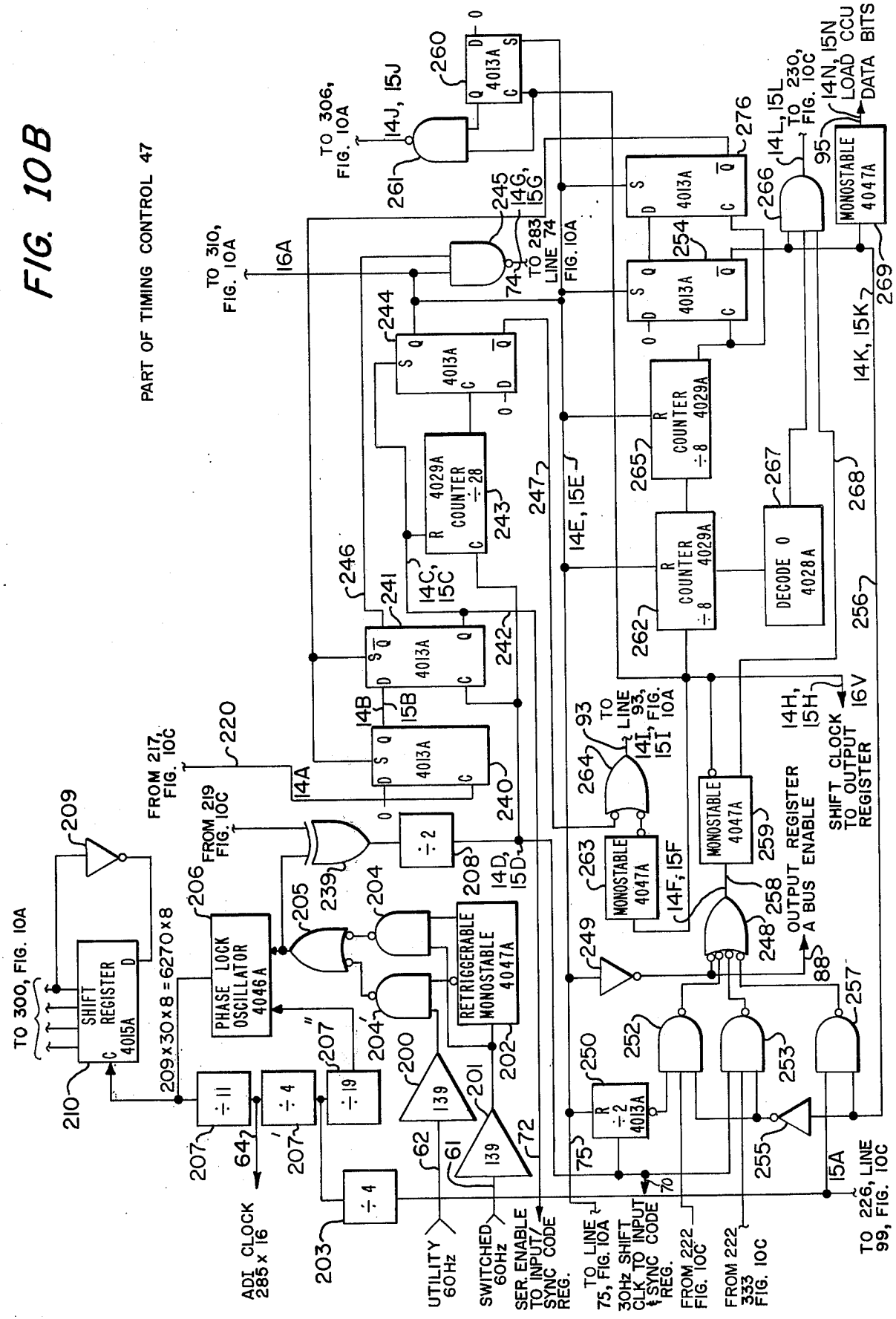
Figure 10C:
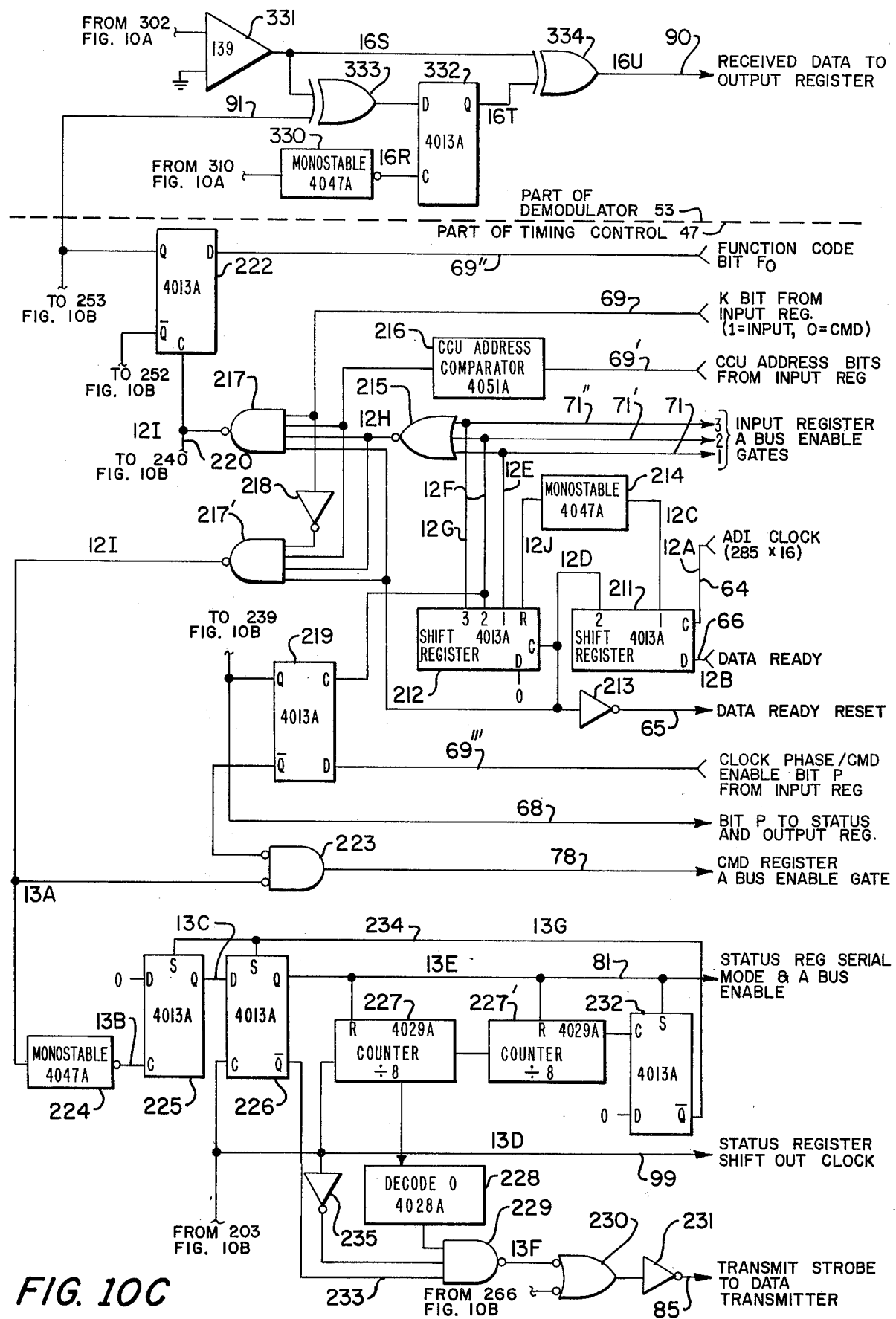
Figure 12:
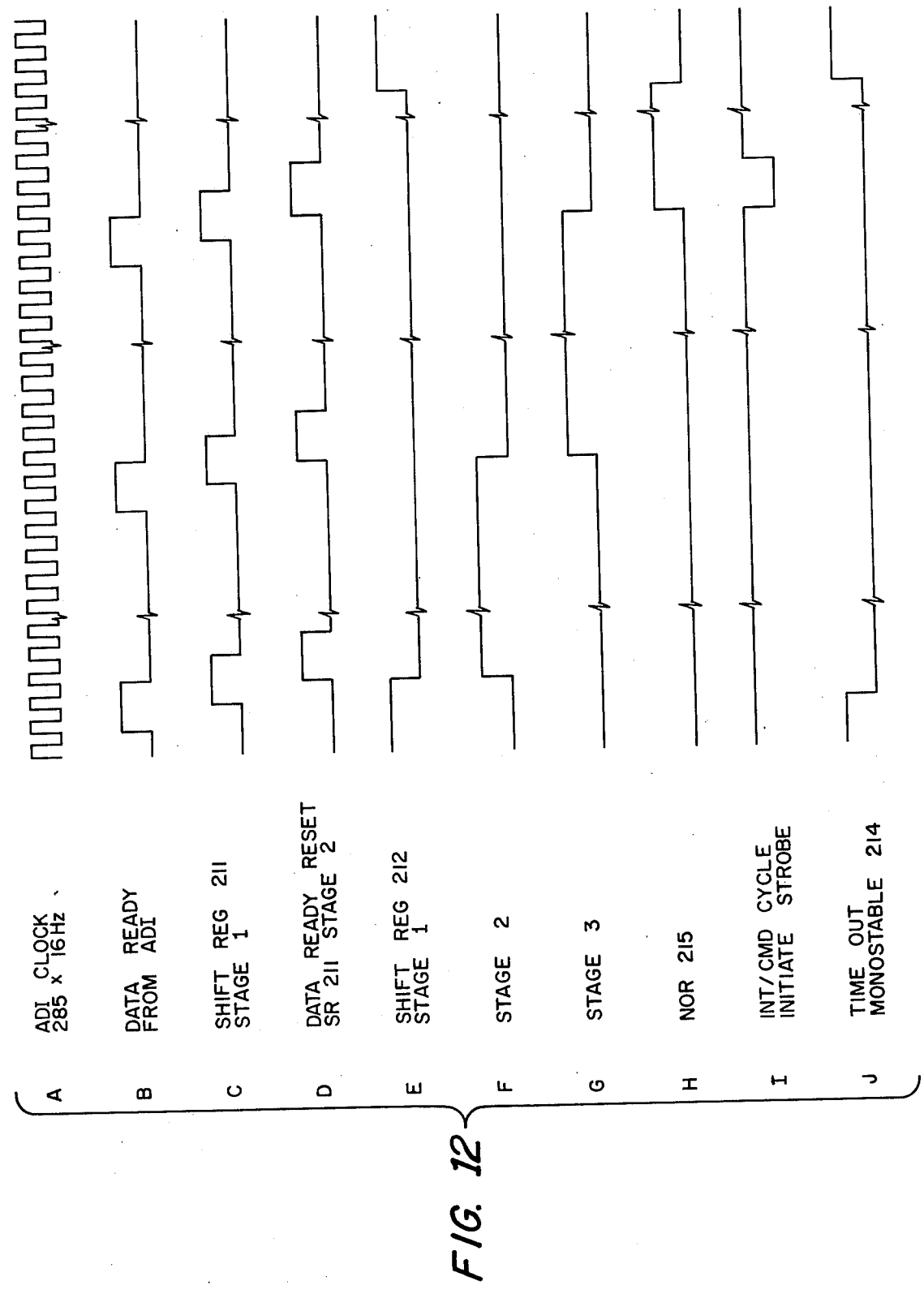
FIG. 12 is a timing diagram helpful in understanding how data transmitted by the data acquisition computer is processed by the central control unit.
Figure 14:
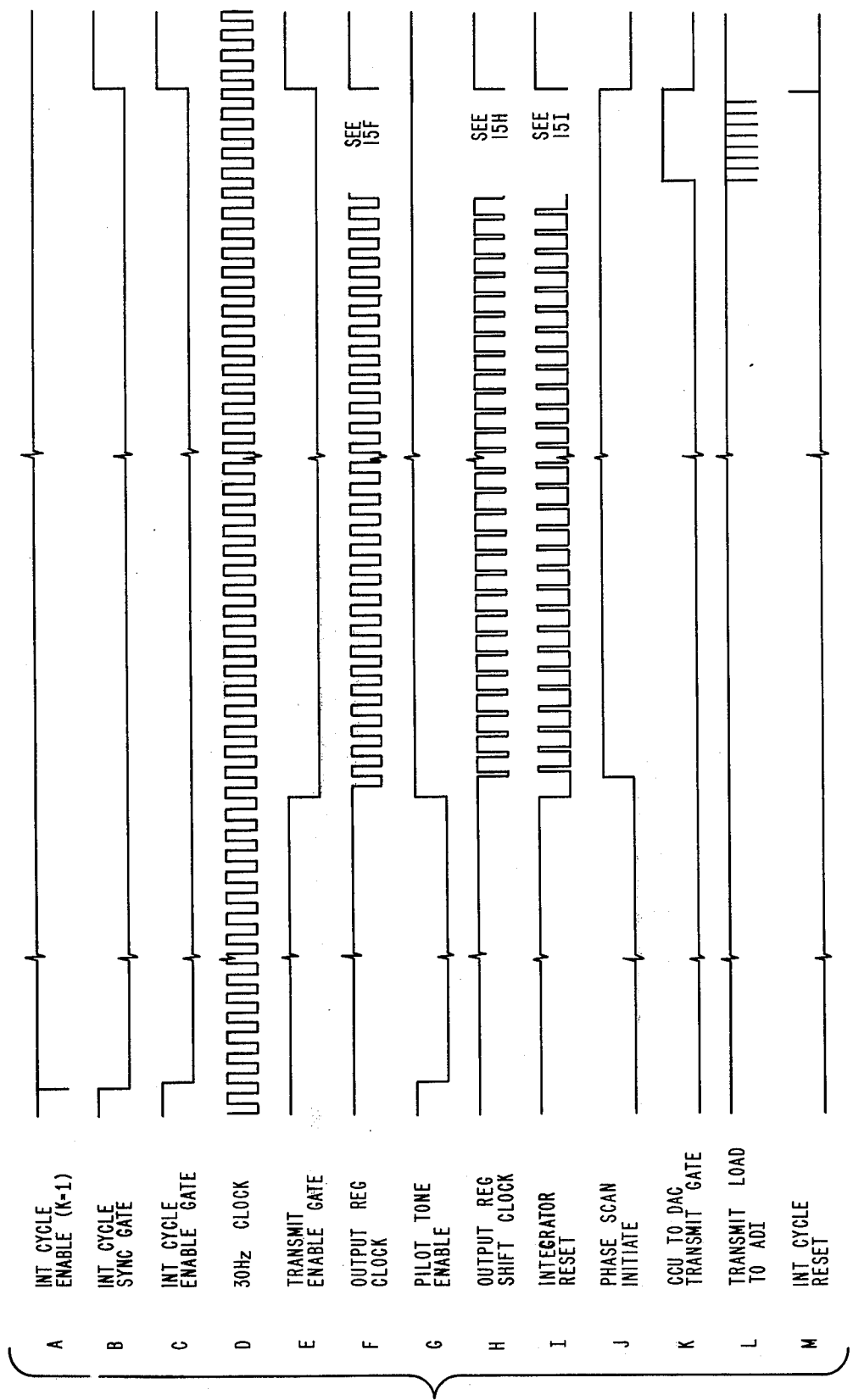
FIG. 14 is a timing diagram showing interrogation cycle timing signal waveforms of the central control unit.
Figure 15:
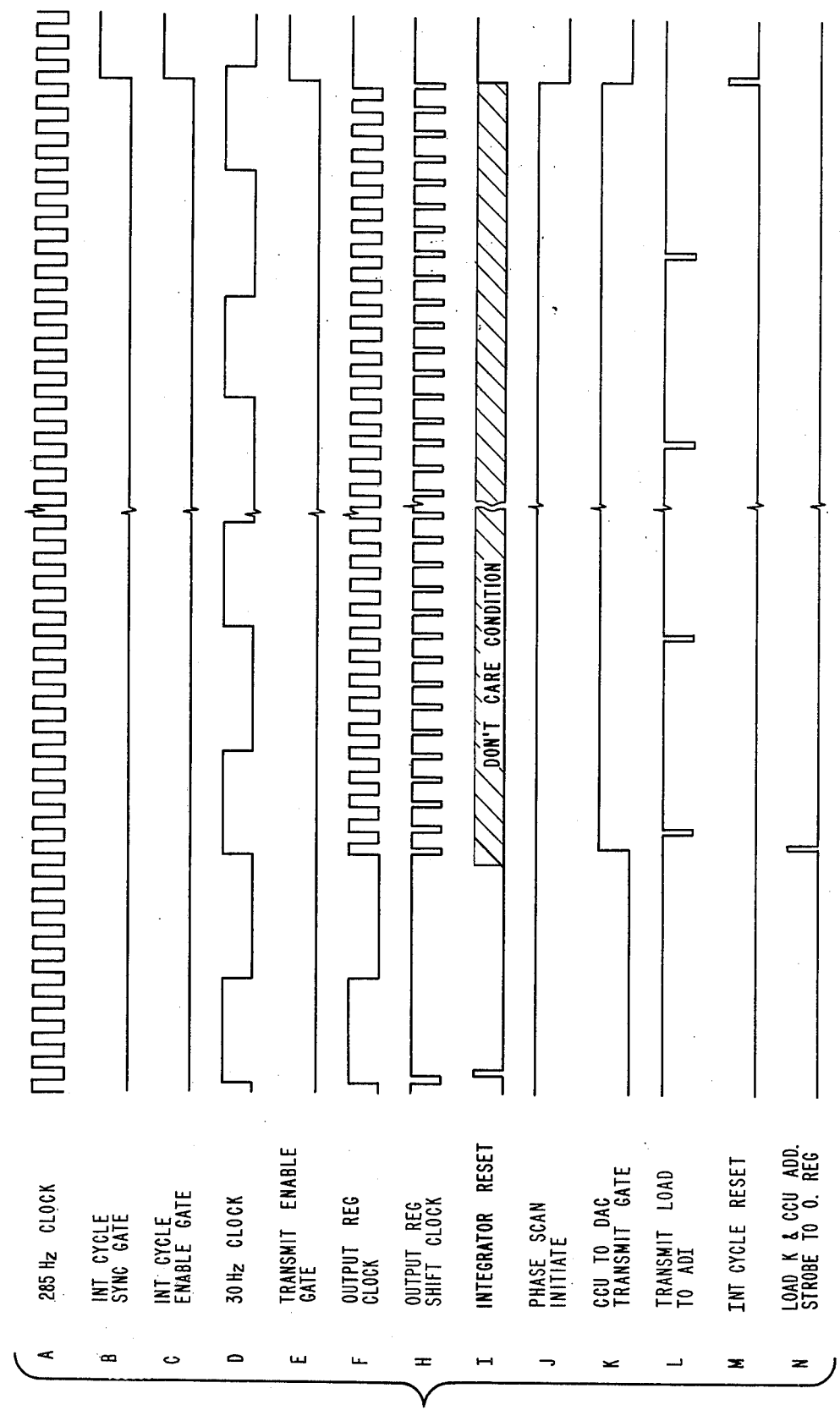
FIG. 15 is a timing diagram showing interrogation cycle signal waveforms related to data transfer from the central unit to the data acquisition computer.

Exemplary embodiments of central control unit modulator 39, demodulator 53 and timing control 47 are shown in FIG. 10 using logic elements of the RCA CD4000A series with key timing relationships presented in FIGS. 11 through 16. The central control unit communication and reference carriers, and a synchronous data interface clock are developed in a phase-lock loop using the 60-Hz power distribution frequency as the source via the utility bus, line 62, or the switched bus, line 61. The sinusoidal signals on lines 61 and 62 are squared using zero crossing detectors 200 and 201 which are National Semiconductor lm139 voltage comparators. If a signal is present at the output of zero-crossing detector 201, such as when relay contact 63, 63' or 63" is closed, retriggerable monostable multivibrator 202, which is a CD4047A, is continuously triggered enabling NAND gate 204 and inhibiting NAND gate 204', thereby selecting the switched bus signal as the timing reference for the central control unit. If no signal is present on the switched bus, line 61, such as when relay contacts 63, 63', and 63" are all open, retriggerable monostable multivibrator 202 remains in its stable state, inhibiting NAND gate 204 and enabling NAND gate 204', thereby selecting the utility bus signal as the timing reference for the central control unit. The basic 30-Hz baud rate clock is obtained from the 60-Hz output of OR gate 205 via exclusive OR gate 239 and divider 208. The polarity of the 60-Hz signal used to clock divider 208 is selected by clock phase bit P on line 69''' via flip-flop 219 and exclusive OR gate 239.

The communication and reference carriers and asynchronous data interface clock are developed in a phase-locked loop oscillator circuit consisting of phase-locked oscillator 206, which is a CD 4046A, dividers 207, 207' and 207", which are CD4029A, and various NAND gates, shift register 210, which is a CD4015A, and inverter 209. The output frequency of phase-locked oscillator 206 is 50,160-Hz, which is eight times 6270-Hz, an odd multiple of 30-Hz. The 50,160-Hz signal is divided by the appropriate factors in dividers 207, 207' and 207", in this instance the division is by 11, 4 and 19, respectively. The output frequency of divider 207 is 4560-Hz, which is sixteen times the 285 baud data transmission rate between central control unit 5 and data acquisition computer 4, while the output of divider 203 is the data transmission rate, 285-Hz. This method of developing the asynchronous data interface clock avoids the necessity of using a crystal stabilized oscillator in each central control unit. The output of divider 207" is fed back to phase-locked oscillator 206 for comparision with the selected 60-Hz power distribution frequency signal from OR gate 205, thereby closing the phase-locked loop. The output of phase-locked oscillator 206 clocks shift register 210 to develop four 6270-Hz signals separated in phase by 45°. The timing relationship between the phase-locked loop oscillator output and the four shift register output signals is illustrated in FIGS. 11A through 11E, which show that the shift register third stage output, FIG. 11D, lags the first stage output, FIG. 11B, by 90°. Therefore, the third stage output is used for the unmodulated communication carrier, and the first stage output or its inverse is used for the modulated carrier.

As previously mentioned, after a byte of data is received by data receiver 36, it sets a Data Ready flag, FIG. 12B, to the timing control 47 via line 66. The signal on line 66 is clocked into shift register 211, which consists of CD4013A flip-flops, by the asynchronous data interface clock on line 64, shown in FIG. 12A. The first clock transition on line 64 after the Data Ready flag is set changes the state of the first stage of shift register 211, FIG. 12C, which triggers monostable multivibrator 214, which is a CD4047A, whose output, FIG. 12J, was resetting shift register 212, which consists of CD4013A flip-flops, to the 100 state as shown in FIGS. 12E, 12F, and 12G. Before the next clock transition on line 64 the output of the first stage of shift register 212, FIG. 12E enables the A bus of the first 8 bits of input register 37 via line 71, thereby transferring data from data receiver 36 to input register 37.

The second clock transition on line 64 after the Data Ready flag is set changes the state of the second stage of shift register 211, FIG. 12D, which resets the Data Ready flag via inverter 213 and line 65, and clocks shift register 212 to the 010 state, thereby clocking the bit P on line 69''' into flip-flop 219, which is a CD4013A. The next two clock transitions on line 64 return shift register 211 to its original state. The second byte of data from data receiver 36 is loaded into the second 8 bits of input register 37 by the second Data Ready flag and the A bus enable signal from the second stage of shift register 212 via line 71', FIG. 12F, and the third data byte is loaded into the third 8 bits of input register 37 by the third Data Ready flag and the A bus enable signal from the third stage of shift register 212 via line 71", FIG. 12G. After the third data byte is loaded into input register 37, NOR gate 215 output, FIG. 12H, enables NAND gates 217 and 217', thereby permitting second stage of shift register 211 to issue a cycle-initiate strobe signal, FIG. 12I, on either line 220 or 221, depending on contents of the command mode control bit on line 69 and central control unit address bits A16 and A17 on line 69'.

If the central control unit address bits from input register 37 on line 69' match the preselected central control unit address, decoder 216, which is a CD4051A, enables NAND gates 217 and 217'. If the mode control bit on line 69 is a logic 1, indicating a meter transponder interrogation cycle is desired, NAND gate 217 is enabled, thereby yielding an interrogation cycle initiate strobe on line 220. If the mode control bit on line 69 is a logic 0, indicating a command cycle is desired, NAND gate 217' is enabled via inverter 218, thereby yielding a command cycle initiate strobe on line 221.

At the end of a preset interval, long enough for three data bytes to be received from data acquisition computer 4, monostable multivibrator 214 returns to its stable state, resetting shift register 212 to the 100 state. Thus, monostable multivibrator 214 returns the central control unit to a known state at periodic intervals, thereby overcoming the problems associated with false data loading due to a noisy communication line, such as 10, or Data Ready line 66.

If the mode control bit on line 69 is logic 0, indicating a command cycle is desired, the cycle initiate strobe from NAND gate 217' on line 221, FIG. 13A, triggers monostable multivibrator 224, which is CD4047A. If the command execute enable bit P, stored in flip-flop 219, is logic 1, AND gate 223 is enabled, and the signal from NAND gate 217' on line 221 enables the A bus of command register 43 via line 78, thereby loading the command bits from input register 37 into command register 43. If bit P stored in flip-flop 219, is logic 0, AND gate 223 is inhibited and the contents of input register 37 are not loaded into command register 43. After a period of about 1 second, monostable multivibrator 224 returns to its stable state, FIG. 13B, thereby clocking flip-flop 225, which is a CD4013A. At the next 285-Hz clock transition on line 99, FIG. 13D, flip-flop 226, which is a CD4013A, changes state, thereby removing the reset level from counters 227, 227' and flip-flop 232, enabling the status register A bus outputs and serial mode of operation via line 81, FIG. 13E, and enabling NAND gate 229 via line 233. The command cycle is therefore synchronized to the 285-Hz clock on line 99 by the output of flip-flop 225, FIG. 13C, controlling the state of flip-flop 226. Counters 227 and 227', which are CD4029A, are incremented by the 285-Hz clock on line 99, and the outputs of counter 227 are sampled by decoder 228, which is a CD4028A. When counter 227 is in the 0 state, decoder 228 enables NAND gate 229, thereby sending a transmit strobe, FIG. 13F, to data transmitter 55 via OR gate 230, inverter 231 and line 85. Since the 285-Hz clock on line 99 is also shifting the contents of status register 44 during this period, the status register contents are transmitted to data-acquistion computer 3 as eight data bytes. After the 64th transition of the 285-Hz clock on line 99, the output of counter 227' clocks flip-flop 232, which is a CD4013A, thereby setting flip-flops 225 and 226, via line 234, FIG. 13G, to their original state, which inhibits the status register A bus outputs and returns the status register to the parallel mode of operation, all via line 81, FIG. 13E, terminating the command cycle. The signal on line 81 also resets counters 227 and 227' and flip-flop 232, while the transmit strobe on line 85, FIG. 13F, is inhibited by the signal from flip-flop 226 on line 233.

If the mode control bit on line 69 is a logic 1, indicating an interrogation cycle is desired, the cycle initiate strobe from NAND gate 217 on line 220, FIG. 14A, clocks function code bit $F_0$ on line 69" into flip-flop 222, which is a CD 4013A, and also clocks flip-flop 240, which is a CD4013A, whose output, FIG. 14B, is clocked into flip-flop 241, which is a CD4013A, by the next transition of the 30-Hz clock on line 70, FIG. 14D, thereby synchronizing the interrogation cycle to the 30-Hz clock. The change in state of flip-flop 241 on line 242, FIG. 14C, removes the reset from counter 243 and the set from flip-flop 244, inhibits the pilot-tone enable on line 74, FIG. 14G, via line 246 and NAND gate 245, and changes input register 37 and sync code register 38 to the serial mode of operation via line 72. The data contained in input register 37 and sync code register 38 is then shifted to modulator 39 at the rate of 30 bits per second by the 30-Hz clock on line 70, FIG. 14D. After the 28 bits of data, representing the sync code, the function code and module address are transmitted to the meter or control modules, counter 243, which is CD4029A, and various NAND gates, clocks flip-flop 244, which is a CD 4013A, thereby inhibiting the transmit enable signal and removing the demodulator phase scan reset signal via line 75, FIG. 14E, removing the demodulator integrator reset signal via line 247, OR gate 264 and line 93, enabling the output register clock output from OR gate 248 and A bus enable gate, line 88, via line 75 and inverter 249, and enabling the demodulator reset strobe via line 247. The signal on line 75, FIG. 14E, also serves to synchronize the 15-Hz clock from divider 250, which is a CD4013A, to the 30-Hz clock, since its reset signal on line 75 changes state on a 30-Hz clock transition. The output register clock frequency is selected by flip-flop 222. If the function code signal on line 69" indicated the module is to reply at 15 baud, NAND gate 252 is enabled and NAND gate 253 is inhibited. If the function code signal on line 69" indicated the module is to reply at 30 baud, NAND gate 252 is inhibited and NAND gate 253 is enabled. At this time NAND gates 252 and 253 are also enabled by the signal from flip-flop 254, which is a CD4013A, via inverter 255 and line 256, while NAND gate 257 is inhibited by the signal on line 256. The output register clock from OR gate 248, line 258, FIG. 14F, triggers monostable multivibrator 259. The first pulse from monostable multivibrator 259, line 89, FIG. 14H, initiates the demodulator phase scan via NAND gate 261 and line 92. The trailing edge of the signal from monostable multivibrator 259, line 89, FIG. 14H, increments counter 262, shifts the contents of output register 54 one bit position, and triggers monostable multivibrator 263, which is a CD4047A, whose output resets the demodulator integrator via OR gate 264 and line 93. The trailing edge of the signal from monostable multivibrator 259 on line 89, FIG. 14H, also clocks flip-flop 260, thereby inhibiting NAND gate 261 and preventing further demodulator phase scans during the remainder of this interrogation cycle. The output pulses from monostable multivibrator 259 on line 89, FIG. 14H, shift the contents of output register 54 and reset the demodulator integrator until counter 265, which is a CD4029A, overflows, indicating 64 bits of data have been received from the interrogated module and loaded in output register 54. The overflow signal from counter 265 clocks flip-flop 254 thereby inhibiting the 30-or 15-Hz clock from NAND gates 252 or 253, enabling the 285-Hz clock from NAND gate 257, all via line 256, FIG. 14K, enabling NAND gate 266, and strobing the mode control and central control unit address bits into output register 54'''' via monostable multivibrator 269 and line 95. This corrects the contents of output register 54, since the last 4 bits received by the demodulator represent noise rather than data from the interrogated module. At this point counters 262 and 265 are in the zero count state, so decoder 267, which is a CD4028A, also enables NAND gate 266, allowing the next pulse from multivibrator 259 on line 268 to send a transmit strobe to data transmitter 55 via NAND 266, OR gate 230, inverter 231 and line 85, FIG. 14L.

Counters 262 and 265 are incremented by the trailing edge of the pulses from monostable multivibrator 259 on line 89, FIG. 14H. Each time counter 262 is incremented to the 000 state a transmit strobe is sent to data transmitter 55. When counter 265 overflows, indicating eight transmit strobes have been sent, and the 64 bits of data in output register 54 have been transmitted to data-acquisition computer 4, flip-flop 270, which is a CD4013A, is clocked, FIG. 14M, thereby resetting flip-flops 240 and 241, returning items 243, 244, 262, 265, 270 and 260 to their original state and terminating the interrogation cycle.

When data is not being transmitted to, or received from, a meter or control module, modulator 39 transmits an unmodulated carrier to power amplifier 40. During this period NAND gate 287 is enabled by the transmit enable signal on line 75, NAND gate 280 is enabled by the pilot-tone-enable signal on line 74, and NAND gates 281 and 282 are inhibited by inverter 283 and the signal on line 74. Thus, the signal on line 73", the unmodulated 6270-Hz carrier, is sent to power amplifier 40 via NAND gates 280 and 287 and OR gate 286. When data is to be transmitted, NAND gate 280 is inhibited by the signal on line 75, and NAND gates 281 and 282 are enabled by inverter 283 and the signal on line 75. If the data to be transmitted on line 58 is logic 1, NAND gate 281 is enabled and NAND gate 282 is inhibited by inverter 287, thereby sending the 6270-Hz signal (that leads the 6270-Hz signal on line 73" by 90°) on line 73 to power amplifier 40 via NAND gates 281 and 287 and OR gate 286. If the data to be transmitted on line 58 is logic 0, NAND gate 281 is inhibited and NAND gate 282 is enabled by inverter 287. The signal on line 73, inverted by inverter 284, becomes a 6270-Hz signal that lags the 6270-Hz signal on line 73"
by 90° and is sent to power amplifier 40 via NAND
gates 282 and 287, and OR gate 286. When data is to
be received, the modulator is inhibited by the transmit
enable signal, line 75, and NAND gate 287.

The video signal from video amplifier 52 on line 96 is
sampled in parallel by four phase detectors 300, 300',
300" and 300'''. Each phase detector uses a receive
carrier, on line 73, 73', 73" and 73''', respectively,
that is separated by 45° to demodulate the video signal
on line 96. Item 300' is a typical phase detector and
comprises amplifier 315, which is a Fairchild Semiconductor 741, resistors 316, 316', 316", 316''' and 316'λ
''', switches 314 and 314', which are CD4066A and are
driven 180° out of phase with each other by the 6270-Hz carrier on line 73', and inverter 313. The operation
of this phase detector is described by J. N. Giles, Linear
Integrated Circuits Applications Handbook, Library of
Congress Catalog 57-27446.

The outputs of the phase detectors are integrated by
integrators 301, 301', 301" and 301'''. Item 301' is a
typical integrator and comprises amplifier 318, which is
a Fairchild semiconductor 741, resistor 317, capacitor
319 and switch 320, which is a CD4066A. At the end of
each bit period capacitor 319 is discharged by switch
320, via the integrator reset signal on line 93. The
integrator outputs are connected to signal bus 324 by
switches 302, 302', 302" and 302''' and to signal bus
325 by switches 303, 303', 303" and 303'''. Switches
302 and 303 are CD4066A. Switches 302, 302', 302"
and 302''' are controlled by shift register 311 via lines
327, 327', 327" and 327''', respectively, while
switches 303, 303' and 303" are controlled by shift
register 310 via lines 326, 326' and 326", respectively.
The absolute magnitude of the signals on lines 324 and
325 is produced by absolute magnitude circuits 304
and 304', respectively. A typical absolute magnitude
circuit 304 comprises amplifier 321, which is a Fairchild Semiconductor 741, diodes 322, which are
IN914, and resistors 323, 323', 323" and 323'''. While
data is being transmitted from central control unit 5 to
a meter transponder, integrators 301, 301', 301" and
301''' are reset by line 93, FIGS. 16W and 14I, while
shaft registers 310 and 311, which are CD4034A, are
held in the parallel mode and flip-flop 312, which is a
CD4013A, is set by line 75, FIGS. 16A and 14E. This
loads 1000 into shift register 310 as shown in FIGS.
16I, 16J, 16K and 16L, and enables the A bus of shift
register 311, via line 328, FIG. 16G, thereby allowing
the contents of shift register 310 to be loaded into shift
register 311 via lines 326, 326', 326" and 326'''. The
shift register 311 assumes the 1000 state as shown in
FIGS. 16M, 16N, 16P and 16Q.

After data is transmitted to the meter transponders,
the phase scan reset on line 95, FIG. 16A, and the
integrator reset on line 93, FIG. 16W, are removed and
integrators 301, 301', 301" and 301''' integrate the
signals from phase detectors 300, 300', 300" and
300''', respectively. At the end of the received data bit
period flip-flop 306, which is a CD4013A, is clocked,
FIG. 16C, by the phase-scan-initiate signal on line 92,
FIG. 16B. The next transition of the 6270-Hz clock on
line 73''', FIG. 16D, clocks flip-flop 307, which is a
CD4013A, thereby synchronizing the phase scan to the
6270-Hz clock. Flip-flop 307 output, FIG. 16E, enables
NAND gate 308, whose output clocks shift register 310
via line 329, FIG. 16F, and flip-flop 312, which is a
CD4013A, via inverter 309.

The algorithm used for the phase scan is to load shift
register 311 with the contents of shift register 310 if the
magnitude of the signal on line 324 is less than the
magnitude of the signal on line 325 and to freeze the
contents of shift register 311 if the reverse is true, all
the while shifting shift register 310. At the start of the
phase scan shift registers 310 and 311 each contain
1000, thereby enabling switch 302 via line 327, FIG.
16M, and switch 303 via line 326, FIG. 16I.

Figure 16:
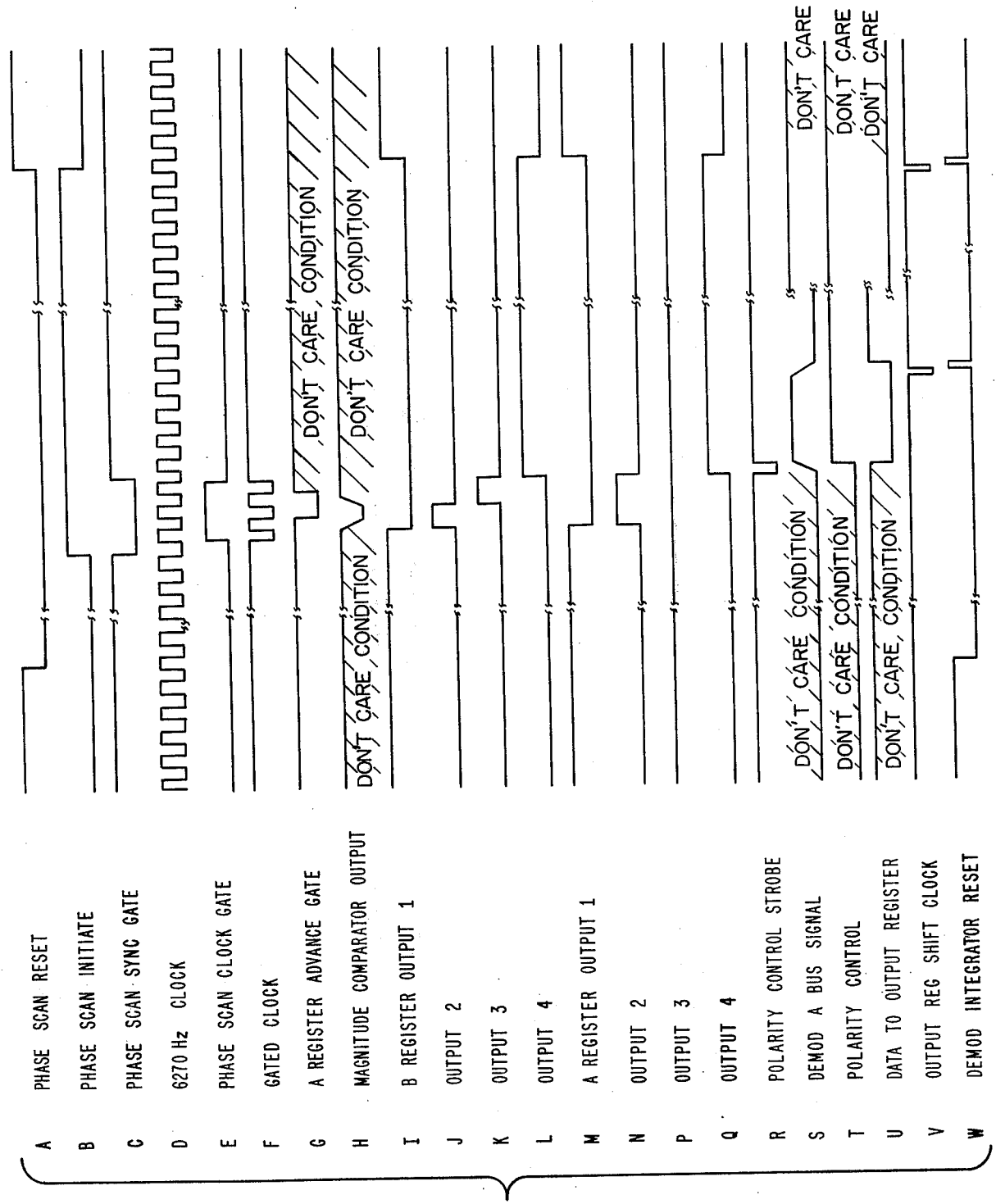
FIG. 16 shows central control unit demodulator phase scan timing signal waveforms.

FIG. 16 illustrates the case where the signal magnitude from integrator 301 on line 324 is less than that
from integrator 301', on line 325, thus the output of
differential comparator 305, which is a National Semiconductor LM139, is high as shown in FIG. 16H, and
the negative-going transition on line 329, FIG. 16F,
clocks an A bus enable signal into flip-flop 312, as
shown in FIG. 16G, thereby allowing shift register 311
to be loaded from shift register 310.

The positive going transition on line 329, FIG. 16F,
shifts the contents of shift registers 310 and 311 to the
0100 state, enabling switch 302' via line 327', FIG.
16N, and switch 303' via line 326', FIG. 16J. FIG. 16
illustrates the case where the signal magnitude from
integrator 301' on line 324 is greater than that from
integrator 301" on line 325, so comparator 305 output,
FIG. 16H, is low and the next negative-going transition
on line 329, FIG. 16F, clocks an A bus inhibit signal
into flip-flop 312 as shown in FIG. 16G, thereby freezing the contents of shift register 311.

The positive-going transition on line 329, FIG. 16F,
shifts the contents of shift register 310 to the 0010
state, while shift register 311 remains in the 0100 state,
thus, switch 302' remains enabled via line 327', FIG.
16N, and switch 303" is enabled via line 326", FIG.
16K. FIG. 16 illustrates the case where the signal magnitude from integrator 301' on line 324 is less than that
from integrator 301''' on line 325, so comparator 305
output, FIG. 16H, is high and the next negative-going
transition on line 329, FIG. 16F, clocks an A bus enable signal into flip-flop 312 as shown in FIG. 16G,
thereby allowing shift register 311 to be loaded from
shift register 310.

The positive going transition on line 329, FIG. 16F,
shifts the contents of shift register 310 and 311 to the
0001 state, thereby enabling switch 302''' via line
327'''. FIG. 16Q, and setting flip-flops 306 and 307
which terminates the phase scan, and triggering monostable multivibrator 330, which is a CD4047A, both via
line 326, FIG. 16L. The output of integrator 301''', via
switch 302''' and line 324, is compared to ground by
differential comparator 331, which is a National Semiconductor LM139, whose output is logic 0 if the signal
on line 324 is negative and logic 1 if the signal on line
324 is positive.

Exclusive OR gate 333 compares the logic level output of differential comparator 331, FIGS. 16S, to the
logic level of the first expected bit, which is function
code bit $F_0$, via line 91. If the inputs to exclusive OR
gate 331 are identical, logic 0 is clocked into flip-flop
332 by monostable multivibrator 330, FIG. 16R. If the
inputs to exclusive OR gate 333 are opposite, a logic 1
is clocked into flip-flop 332, which is a CD4013A.

The polarity level from flip-flop 332, FIG. 16T, is
compared to the signal from differential comparator
331 by exclusive OR gate 334 and sent to output register 54 via line 90, FIG. 16U. The selected integrator
and polarity level are used to receive the remainder of
the interrogated module message until reset by the phase scan reset signal, line 75, FIGS. 16A and 14E, and polarity clock pulse, FIG. 16R, during the next interrogation cycle. The output register shift clock and demodulator integrator lines 89 and 93, FIGS. 14H and 14I, respectively, are shown for reference as FIGS. 16V and 16W, respectively.

Figure 17:
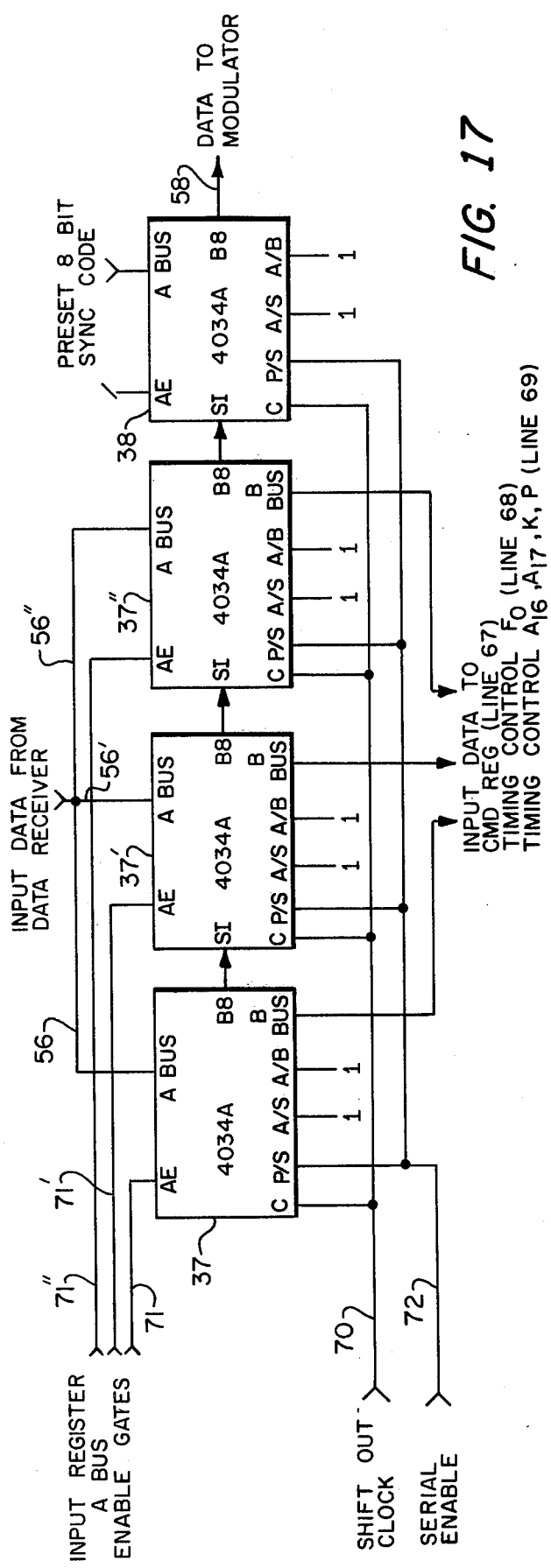
FIG. 17 shows specific circuit connections among integrated circuits forming the input register and sync code register.

Exemplary embodiments of input register 37 and sync code register 38, command register 43, status register 44 and output register 54 using logic elements of the RCA CD4000A series are shown in FIGS. 17, 18, 19 and 20, respectively. With reference to FIG. 17, the input register and sync code register comprises CD4034A 8-bit registers, operated in the asynchronous mode with A bus data input and B bus data output and are normally operated in the parallel mode. The first data byte, on line 56, from data receiver 36 is loaded into register 37 by the A bus enable gate signal from timing control 47 on line 71; the second data byte, on line 56', is loaded into register 37' from the A bus enable signal on line 71' and the third data byte, on line 56'', are loaded into register 37'' by the A bus enable signal on line 71''. The A bus of sync code register 38 is always enabled, thereby continuously loading the preset eight bit synchronization code. The contents of registers 37, 37' and 37'' are available for transfer to timing control 47 or command register 43 via the B bus outputs. During an interrogation cycle, registers 37, 37', 37'' and 38 are transferred to the serial mode of operation by the serial enable signal on line 72, and the register contents are shifted to modulator 39 by the shift clock on line 70, both signals from timing control 47.

Figure 18:
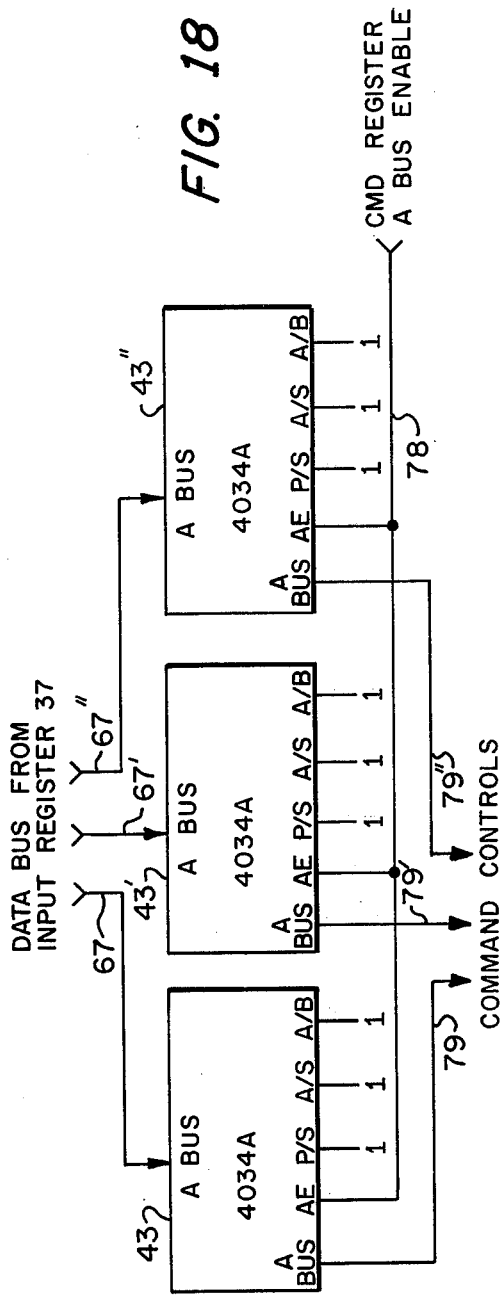
FIG. 18 shows specific interconnections among integrated circuits forming the central control unit command register.

With reference to FIG. 18, the command register comprises CD4034A 8-bit registers operated in the asynchronous, parallel mode, with A bus data input and B bus data output. Data from input register 37 is continuously available on lines 67, 67' and 67''. When the message mode indicator bit K indicates the contents of input register 37 is a command, the data on lines 67, 67' and 67'' are loaded into registers 43, 43' and 43'', respectively, by the A bus enable signal on line 78 from timing control 47. The contents of command registers 43, 43' and 43'' are available on B bus lines 79, 79' and 79'', respectively.

Figure 19:
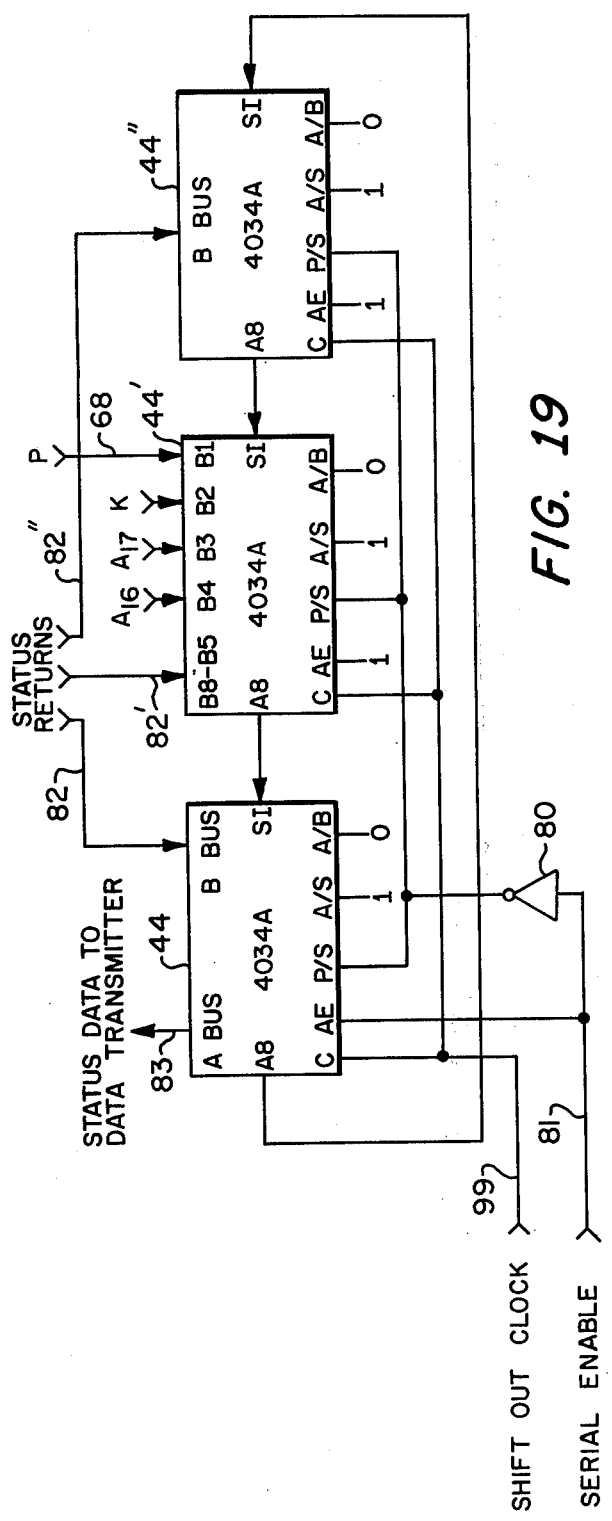
FIG. 19 shows the specific interconnections among components forming central control unit status register.

With reference to FIG. 19, the status register comprises CD4034A 8-bit registers operated in the asynchronous mode with B bus data input and A bus data output. Status data is continuously available on lines 82, 82' and 82'', while the preset message mode indicator bit K (preset to logic 0) preset central control unit address bits $A_{16}$ and $A_{17}$ and command execute enable bit P on line 68 are continuously available as inputs B1 through B4 of register 44'. When the status register contents are to be sent to data transmitter 55 via line 83, the A bus outputs of register 44 are enabled and registers 44, 44' and 44'' are operated in the serial mode by the serial enable signal from timing control 47 on line 81, and inverter 80, respectively. The contents of registers 44, 44' and 44'' are shifted by the clock on line 99 from timing control 47.

Figure 20:
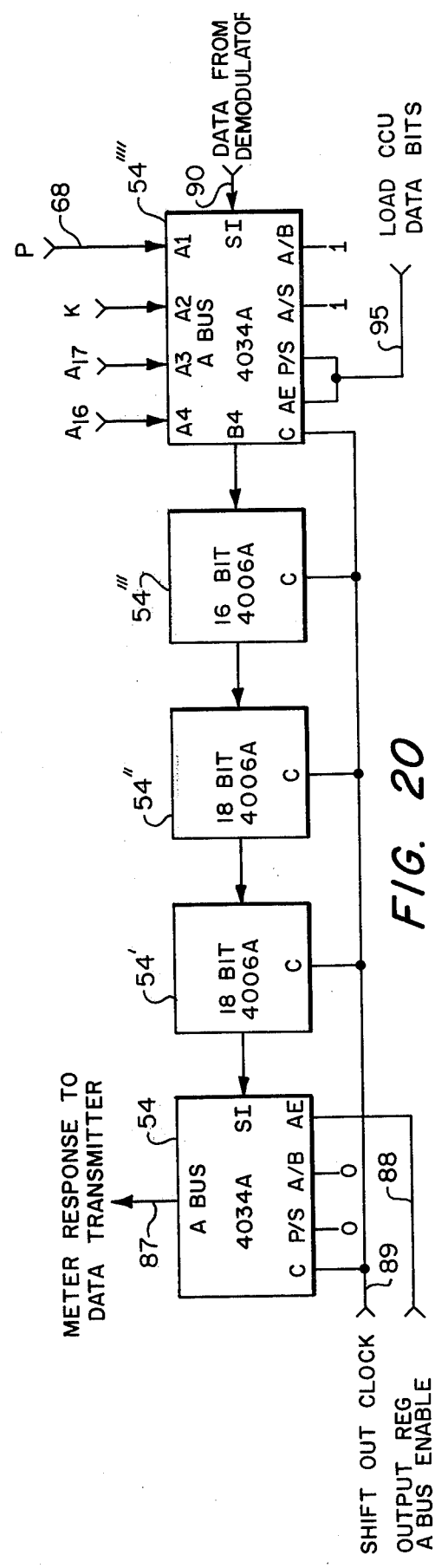
FIG. 20 shows specific circuit interconnections among integrated circuits forming the central control unit output register.

With reference to FIG. 20, the 64-bit output register comprises eight-bit register 54 and four-bit register 54''''', which are CD4034A, two 18-bit registers 54' and 54'', which are CD4006A, and a 16-bit register 54''', which is CD4006A. Registers 54, 54', 54'' and 54''' are always operated in the parallel mode, while the A bus of register 54 is used to transfer data, via line 87, to data transmitter 55. While receiving data from demodulator 53, via line 90, data is shifted from register 54''''', to register 54 by the shift clock, on line 89, from timing control 47. After the meter module reply message had been received, the 60-bit reply message resides in registers 54, 54', 54'' and 54'''. Timing control 47 then enables the A bus output of register 54 via line 88. Simultaneously, register 54''''' is transferred to asynchronous parallel mode for a short period of time, via timing control 47 strobe signal on line 95, thereby loading the message mode indicator bit K, preset to logic 1, preset central control unit address bits, $A_{16}$ and $A_{17}$, and clock phase bit P on line 68 into register 54''''' via A bus inputs A1 through A4, respectively. The contents of registers 54', 54'', 54''' and 54''''' are then shifted to register 54 for transfer to data transmitter 55.

Figure 21A:
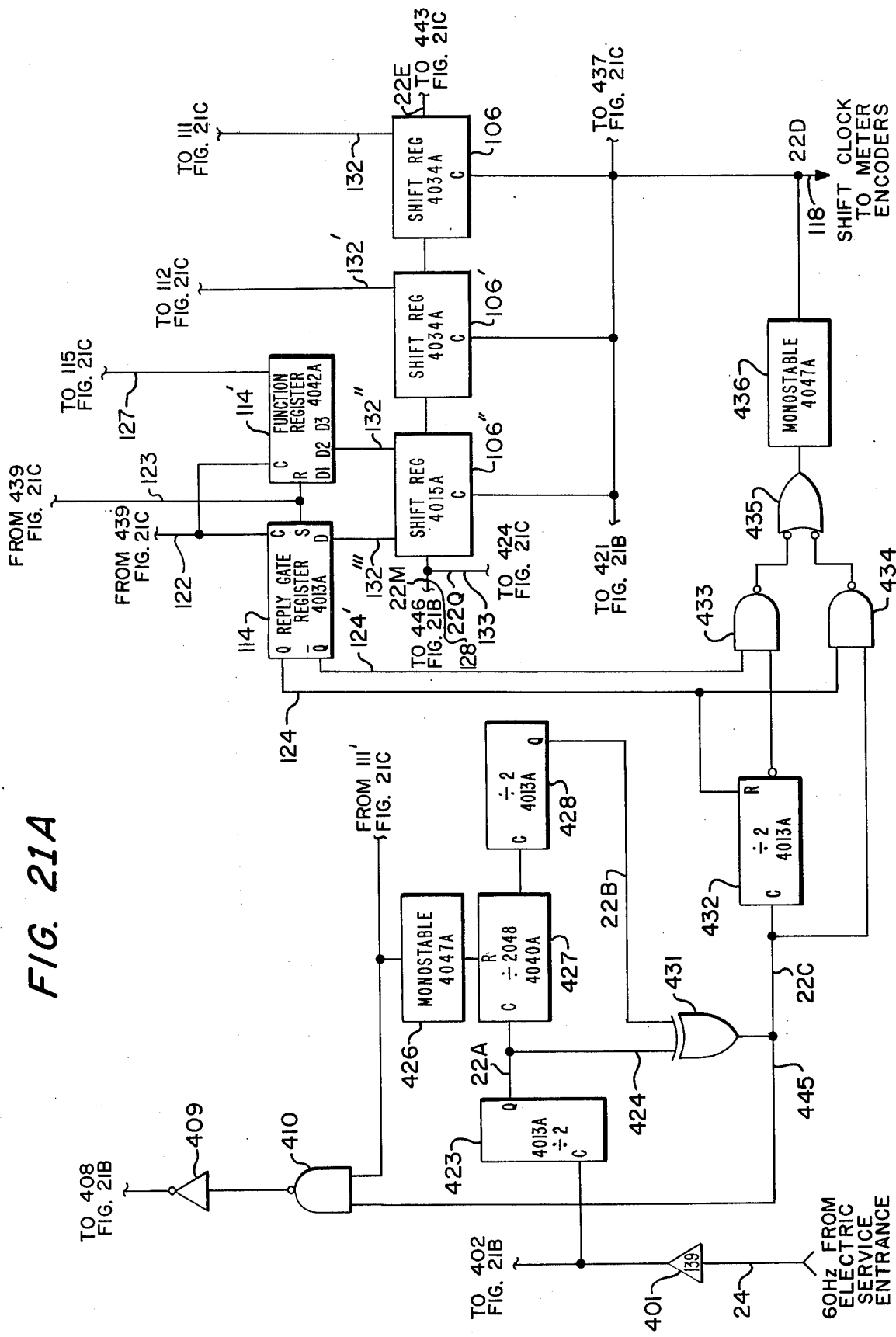
FIG. 21 shows specific interconnections among components forming the demodulator, modulator and timing control for the transponder; and is set forth on two sheets designated FIGS. 21A and 21B, respectively.
Figure 21B:
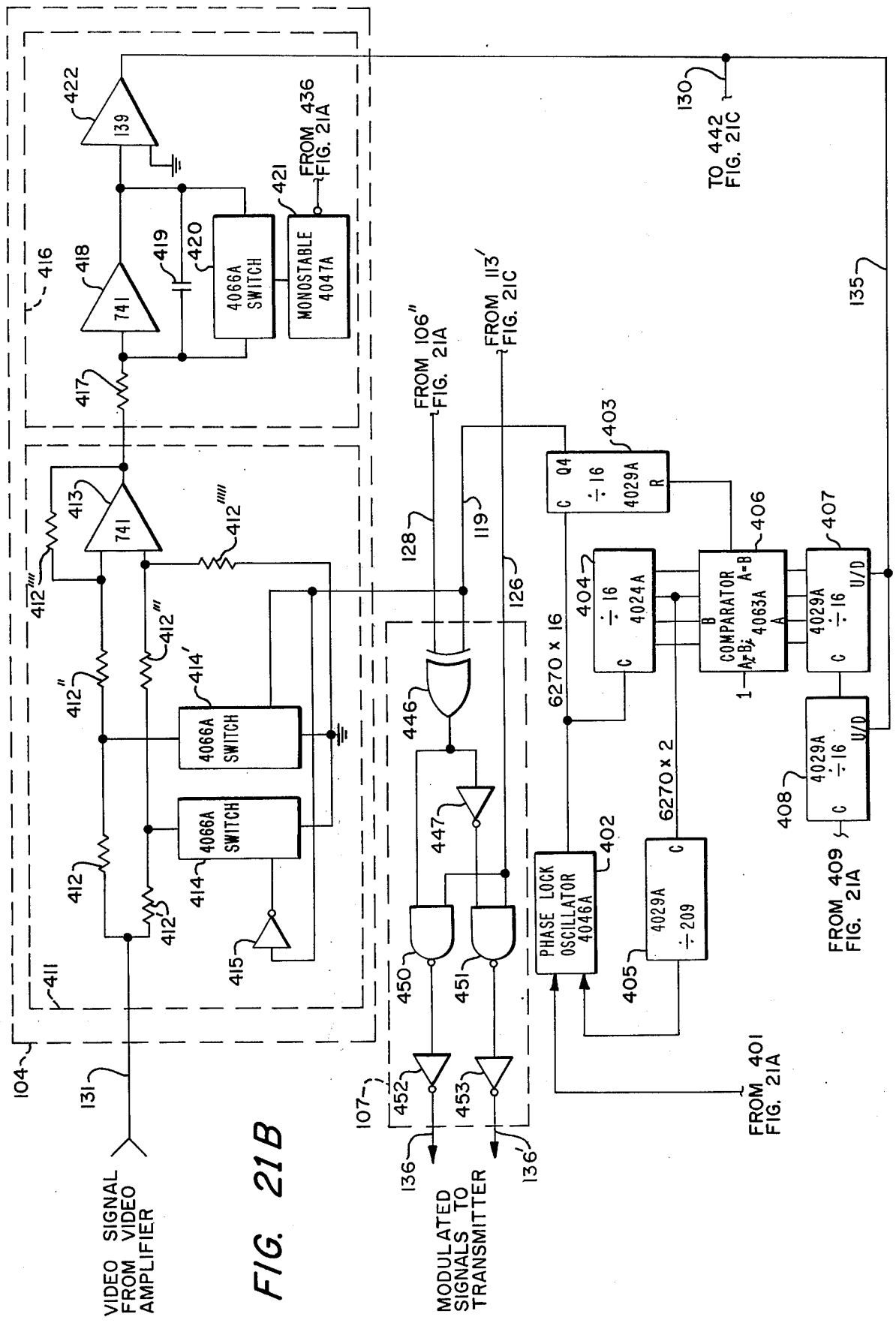
Figure 21C:
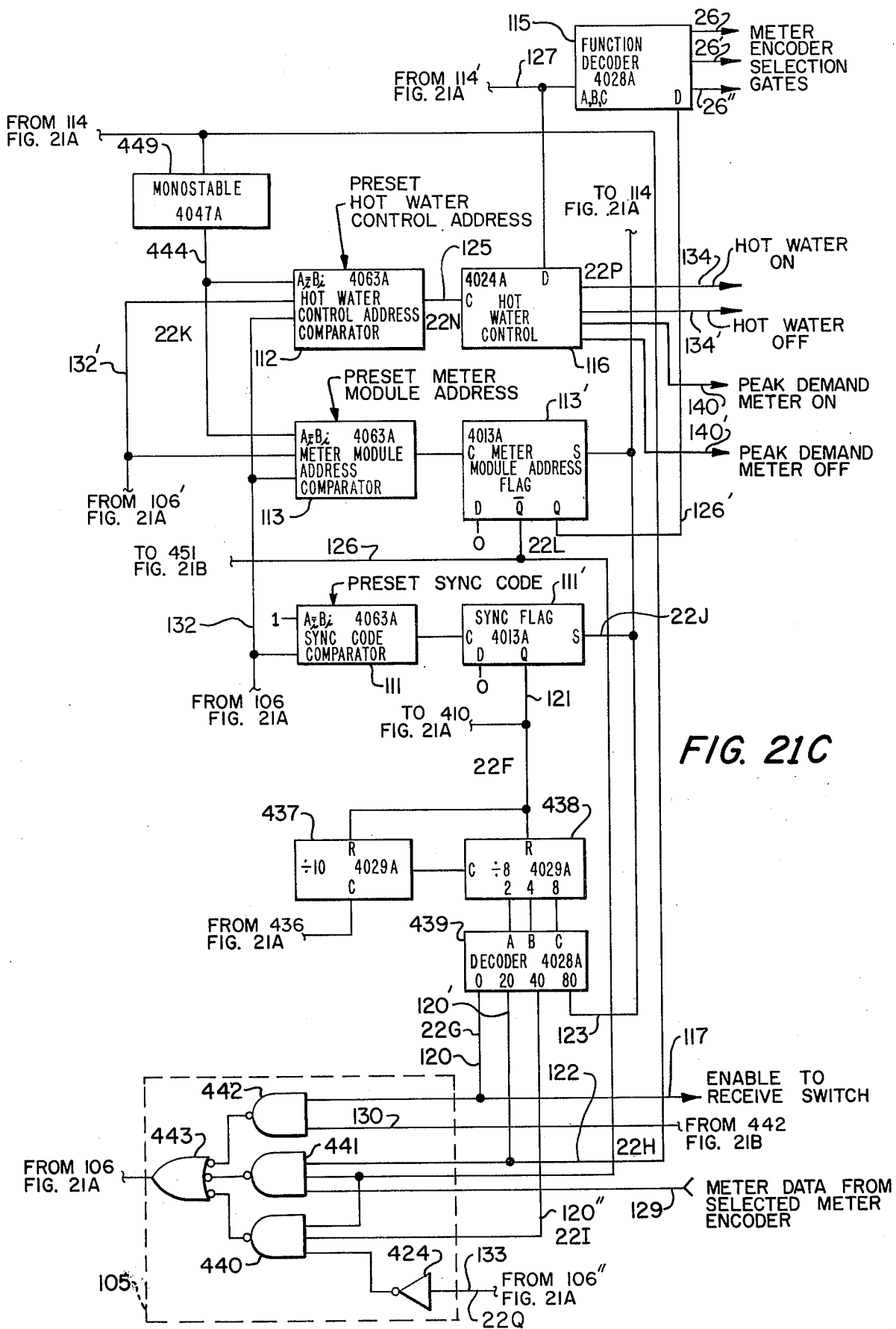
Figure 22:
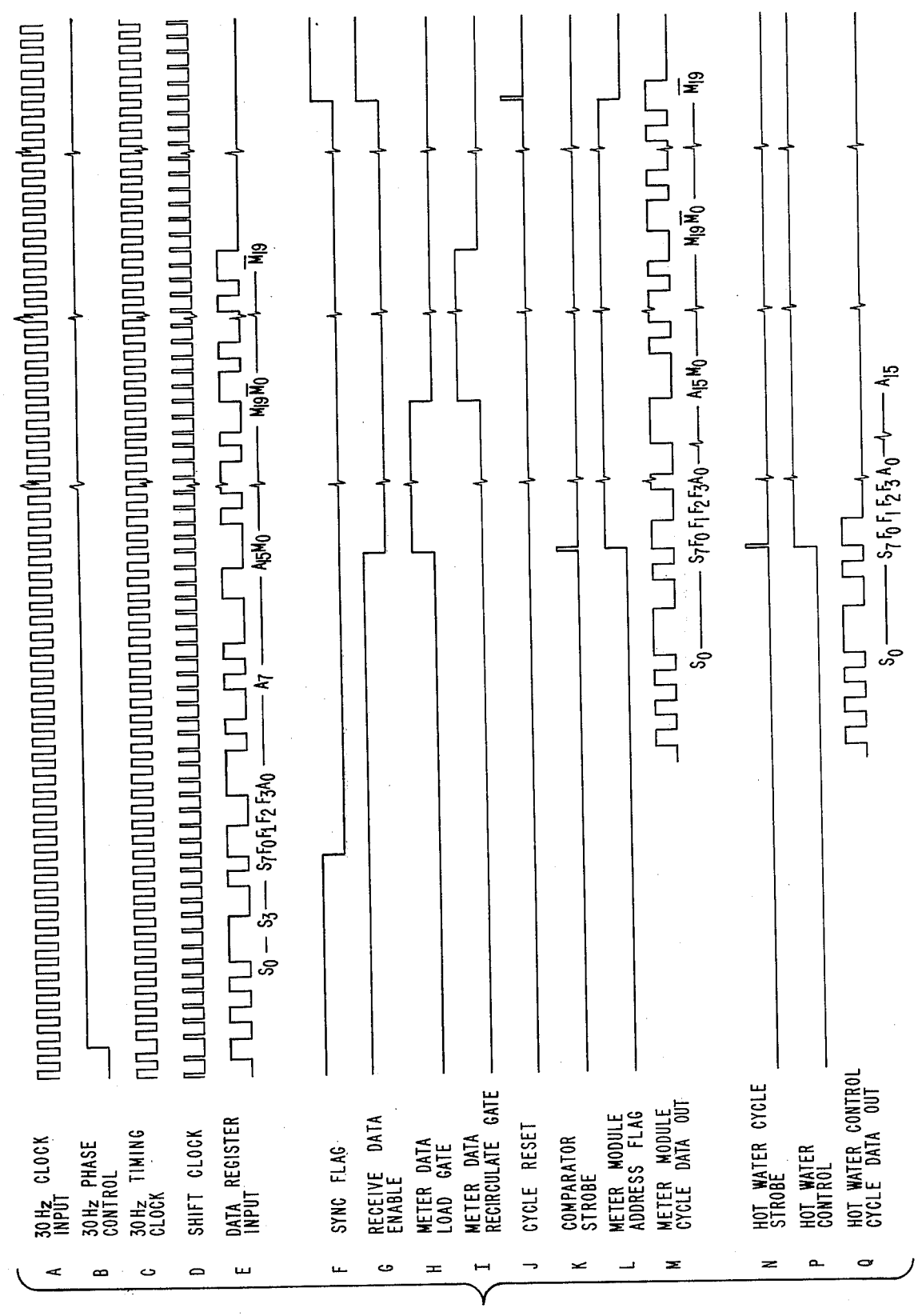
FIG. 22 shows timing signal waveforms of the transponder of FIG. 21.

Exemplary embodiments of transponder demodulator 104, data control 105, data register 106, modulator 107, timing control 110, synchronization code comparator 111, hot water control address comparator 112, meter module address comparator 113, function code register 114, function decoder 115 and hot water control 116 are shown in FIG. 21, using logic elements of the RCA CD4000A series, with key timing relationships shown in FIG. 22.

The transponder 30-Hz basic timing block, line 424, FIG. 22A, is derived from the nominal 60-Hz power distribution frequency via line 24, differential amplifier 401, which is a National Semiconductor LM139, and divider 423, which is a CD4013A. The phasing of the 30-Hz clock output of exclusive OR gate 431, line 445, FIG. 22C, is controlled by dividers 427 and 428, which are CD4040A and CD4013A, respectively, and monostable multivibrator 426, which is a CD4047A. Each time the synchronization code is received monostable multivibrator 426 is triggered by the sync flag signal, on line 121, FIG. 22F, thereby resetting divider 427. If a synchronization code match is not detected during a duration of 2048 successive 30-Hz clock periods, about 68.3 seconds, divider 428 is toggled, FIG. 22B, thereby inverting the phase of the 30-Hz clock on line 445. While interrogating meters or controlling hot water heaters, central control unit 5 will be transmitting a message, including the synchronization code, about every 5 seconds. Thus, once 30-Hz clock phase synchronization is obtained, divider 428 will remain quiescent. The shift clock on line 118, FIG. 22D, is developed from the 30-Hz clock on line 445 via NAND gate 434, which is normally enabled by line 124, OR gate 435 and monostable multivibrator 436, which is a CD4047A.

The reference frequency for demodulator 104 and modulator 107 are developed in a phase-locked loop oscillator which uses the 60-Hz power distribution frequency, via differential amplifier 401, as the source reference frequency. The output frequency of phase-locked oscillator 402, which is a CD4046A, is 100,320-Hz, which is sixteen times the communication carrier frequency, 6270-Hz, and is divided by eight in divider 404, which is a CD4029A, and by 209 in divider 405, which is a CD4029A, to produce a 60-Hz signal that is fed back to phase-locked oscillator 402, thereby closing the phase-locked loop. The 100,320-Hz output of phase-locked oscillator 402 is also divided by sixteen by divider 403, which is a CD4029A, to obtain the 6270-Hz reference frequency, on line 119, used by demodulator 104 and modulator 107. The phase of the reference frequency on line 119 is controlled by the data received from demodulator 104 via line 135 and inverter 425.

While central control unit 5 transmits an unmodulated carrier, up/down counters 407 and 408, which are CD4029A, are clocked by the 30-Hz signal on line 445, FIG. 22C, via NAND gate 410 and inverter 409. If demodulator 104 output is a logic 0, counters 407 and 408 are incremented upward. If the signal on line 135 is a logic 1, they are decremented downward. The output of counter 407 is compared to the output of divider 404 by digital comparator 406, which is a CD4063A. When the outputs match, divider 403 is reset. Thus, an excess of logic 0's from demodulator 104 will advance the 6270-Hz reference frequency on line 119, while an excess of logic 1's will retard the phase, thereby phase locking the 6270-Hz reference frequency on line 119 to the unmodulated carrier received from central control unit 5.

Counter 408 has a scale factor of sixteen; therefore, an accumulated excess of sixteen logic 1's or logic 0's is required before the phase of the 6270-Hz reference frequency on line 119 is advanced or retarded, thereby making the circuit insensitive to short term variations. When the synchronization code, which has a balanced quantity of logic 1's and 0's, is received and detected, the phase shift circuits are inhibited via the sync flag signal on line 121, FIG. 22F, and NAND gate 410. This prevents the phase control circuits from acting on function bits, $F_0$ through $F_3$, and address bits, $A_0$ through $A_{15}$, of the interrogation message from central control unit 5. After the meter transponder interrogation cycle is complete the sync flag signal on line 121, FIG. 22F, again enables the phase control circuitry. Data is obtained from video amplifier 103 signal, on line 131, by demodulator 104 which comprises transformerless phase detector 411 and integrator 416. Phase detector 411 comprises resistors 412, 412', 412'', 412''', 412'''' and 412''''', operational amplifier 413, which is a Fairchild Semiconductor 741, and switches 414 and 414', which are CD4066A, driven 180° out of phase by inverter 415 and the 6270-Hz reference frequency on line 119. Phase detector 411 output is integrated by integrator 416, which comprises resistor 417, operational amplifier 418, which is a Fairchild Semiconductor 741, capacitor 419, switch 420, which is a CD4066A, monostable multivibrator 421, which is a CD4047A, and differential amplifier 422, which is a National Semiconductor LM139. When the output of operational amplifier 418 is positive, the output of differential amplifier 422, on lines 130 and 135, is logic 1. When the output of amplifier 418 is negative, the output of amplifier 422 is logic 0. At the end of each bit period the negative-going transition of the shift clock on line 118, FIG. 22D, triggers monostable multivibrator 421, thereby discharging capacitor 419 via switch 420 and resetting integrator 416.

Before the synchronization code is received, the sync flag signal on line 121, FIG. 22F, continuously resets counters 437 and 438, which are CD4029A, to the zero state, thereby developing an enable signal on lines 117 and 120, FIG. 22G, from decoder 439, which is a CD4028A. Thus, receive switch 102 is enabled and data from demodulator 104 is clocked into data register 106, consisting of shift registers 106 and 106', which are CD4034A, and 106'', which is a CD4015A, by the 30-Hz shift clock on line 118. FIG. 22D via OR gate 443 and NAND gate 442 which is enabled by the control signal on line 120. The data register input signal is shown in FIG. 22E. OR gate 443 and NAND gate 442 form part of data control 105, the remainder of which comprises NAND gates 440 and 441, and inverter 424. The first eight bits of data register 106 are compared to the present synchronization code by digital comparator 111, which is two CD4063A, via line 132. When a synchronization code match is detected, sync flag flip-flop 111', which is a CD4013A, is clocked, removing the reset from counters 437 and 438, triggering monostable multivibrator 426 and inhibiting NAND gate 410, via line 121 FIG. 22F.

Twenty bit periods after the synchronization code match is detected, decoder 439 inhibits receive switch 102, via line 117, demodulator 104 data flow through data control 105, via the control signal on line 120, FIG. 22G, triggers monostable multivibrator 449, and clocks function code bit $F_0$, on line 132''' from data register 106'', into reply rate register 114 and function code bits $F_1$, $F_2$, $F_3$, on line 132'' from data register 106'', into function register 114', via the control signal on line 122, FIG. 22H, and enables meter data flow through data control 105 via the control signal on line 120', FIG. 22H. The reply data rate is determined by function code bit $F_0$ in reply rate register 114, which is a CD4013A. If the $F_0$ bit is logic 1, the reply rate is 30 baud and NAND gate 434 is enabled via line 124. If the $F_0$ bit is logic 0, the reply rate is 15 baud and divider 432, which is CD4013A, is enabled by the signal on the line 124, thereby synchronizing the 15-Hz clock to the 30-Hz clock, while NAND gate 443 is enabled by the signal on line 124'. Thus, the shift clock frequency on line 118, FIG. 22D, is determined by the contents of reply register 114.

The preset meter module address and hot water control address codes are simultaneously compared to address bits $A_0$ through $A_{15}$, from data registers 106' and 106 by digital comparators 113 and 112, respectively, which are CD4063A, via lines 132 and 132'. Monostable multivibrator 449, which is a CD4047A, enables comparators 113 and 112 via line 444, FIG. 22K, to detect a meter module address match, a hot water control address match, or no match.

If comparator 113 detects a meter module address was received, meter module address flag flip-flop 113', which is a CD4013A, is clocked, thereby enabling function decoder 115, via line 126', and meter data flow through data control 105, and modulator 107, via meter module address flag on line 126, FIG. 22L. Function code bits $F_1$, $F_2$, $F_3$ are held in function register 114', which is a CD4042A, and are decoded by function decoder 115, which is a CD4028A, via line 127. Only one meter encoder is enabled by function decoder 115, such as electric meter encoder via line 26.

During the 20-bit periods immediately following meter module address detection, function code and address data is shifted to modulator 107 from data register 106, via line 128, FIG. 22M, while meter reading data bits $M_0$ through $M_{19}$ from the selected meter encoder are shifted into data register 106 via line 129 and data control 105, which is enabled by decoder 439 control signal on line 120', FIG. 22H. During the second 20-bit period following meter module address detection the meter reading data contents of data register 106 are shifted to modulator 107 via line 128, FIG. 22M, while inverted meter data bits $\overline{M}_0$ through $\overline{M}_{19}$ are shifted into data register 106, FIG. 22E. via line 133 and data control 105, which is enabled by decoder 439 control signal on line 120'', FIG. 22I. During the third 20-bit period following meter module address detection the inverted meter data in data register 106 is shifted to modulator 107 via line 128, FIG. 22M, and data register 106 is loaded with logic 0's, as shown in FIG 22E, since data control 105 is inhibited by decoder 439.

At the end of this period decoder 439 control signal on line 123, FIG. 22J, sets sync flag flip-flop 111', meter module address flag flip-flop 113', and reply rate register 114 and resets function register 114', thereby resetting bit counters 437 and 438 to the zero state and enabling NAND gate 410 via line 121, FIG. 22F, inhibiting function decoder 115, via line 126, meter data entry to data control 105 and modulator 107, via line 126, FIG. 22L, setting the shift clock on line 118 to 30-Hz via line 124, and enabling receive switch 102, via line 117, FIG. 22G. The transponder now resumes searching the received data for the next synchronization code transmission from central control unit 5.

If comparator 112 detects a hot water control address, the function code bits, on line 127, are clocked into hot water control register 116, which is a CD4042A, by the strobe from comparator 112 on line 125, FIG. 22N. This performs the desired control function, such as turning the hot water heater control relay on, via line 134, or peak demand meter control relay on, via line 140, FIG. 22P. The meter transponder then idles for 60-bit periods, since modulator 107, function decoder 115 and data control 105 are not enabled by meter module address flag signal on line 126. At the end of 60-bit periods, whose duration is determined by function code bit $F_0$ of reply rate register 114, receive sync flag flip-flop 111' and reply rate register 114 are reset by decoder 439 control signal on line 123, FIG. 22J, thereby resetting bit counters 437 and 438 to the zero state and enabling NAND gate 410 via line 121, FIG. 22F, setting the shift clock on line 118 to 30-Hz via line 124, and enabling receive switch 102, via line 117, FIG 22G.

If no address match is detected by comparators 112 and 113, transponder 12 performs no control function and idles for 60 bit periods, whose duration is determined by function code bit $F_0$ of reply rate register 114, and then resets as in the hot water control cycle.

The signal from data register 106, on line 128, FIGS. 22M and 22Q, modulates the phase of the 6270-Hz reference frequency, on line 119, in exclusive OR gate 446, thereby producing the desired 180° phase shift between communication carrier outputs representing logic 1 and logic 0. The modulated signal, and its inverse via inverter 447, are enabled in NAND gates 450 and 451 by meter module address flag signal on line 126, FIG. 22L, which drive transmitter 108 via inverters 452 and 453, and lines 136 and 136', respectively.

Figure 23:
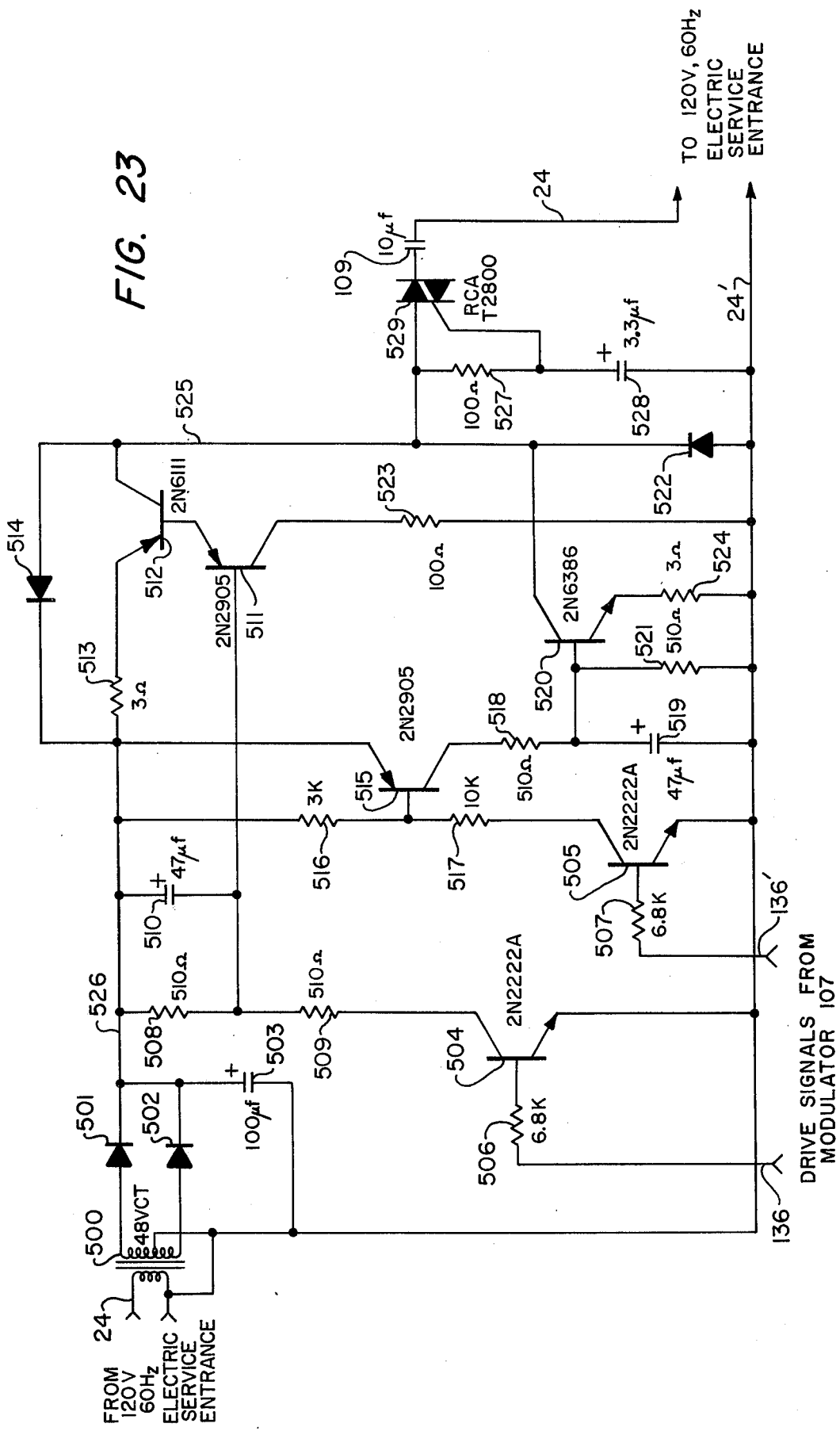
FIG. 23 is a schematic circuit diagram of an exemplary transponder transmitter.

With reference to FIG. 23, there is shown an exemplary embodiment of transponder transmitter 108. Transformer 500, which is a Stancor P-8605, steps down the 120V, 60-Hz power line voltage from electric service entrance 24 and 24'. The reduced voltage is rectified by diodes 501 and 502, which are Motorola MR751, and filtered by capacitor 503. Transistors 504 and 505, which are 2N2222A, are normally turned off by the modulator signals on lines 136 and 136', via resistors 506 and 507, respectively. When modulator 107 is enabled, transistors 504 and 505 are switched 180° out of phase. When transistor 504 is switched on, current flows through resistors 508 and 509, charging capacitor 510, thereby slowly switching on transistor 511, which is a 2N2905, whose collector current is limited by resistor 523, and transistor 512, which is a 2N6111 whose emitter current is limited by resistor 513. This raises the voltage on line 525 to that on line 526, thereby charging capacitor 528 through resistor 527. The voltage drop across resistor 527 causes triac 529 to conduct. When the modulator signal on line 136 switches off transistor 504, capacitor 510 discharges through resistor 508, slowly switching off transistors 511 and 512 while diode 514, which is a Motorola MR751, clips the spike created by the inductance of electric service entrance 24 and distribution transformer 10. When transistor 505 is switched on by modulator signal 136', transistor 515, wich is a 2N2905, is switched on via resistors 516 and 517. Current then flows through resistor 518, charging capacitor 519, thereby slowly turning on transistor 520, which is a 2N6386, whose emitter current is limited by resistor 524. This lowers the voltage on line 525 to that on line 24', the service entrance neutral, thereby discharging capacitor 528 through resistor 527. The voltage drop across resistor 527 causes triac 529 to conduct. When the modulator signal on line 136' switches off transistor 505, capacitor 519 discharges through resistor 521, slowly switching off transistor 520, while diode 522, which is a Motorola MR751, clips the spike created by the inductance of electric service entrance 24 and distribution transformer 10. The voltage transistions on line 525 are coupled to the electric service entrance, lines 24 and 24', by coupling capacitor 109.

The circuitry just described comprises a source of unipolar potential on line 26 derived from the electrical power and having ripple at the power line frequency. The transistor circuitry comprises means for interrupting the unipolar potential at a rate corresponding to the carrier frequency in response to the means for modulating applied to the bases of transistors 504 and 505 to interrupt the unipolar potential at a rate corresponding to the carrier frequency. The triac 529 comprises means for coupling the interrupted unipolar potential to the power lines to provide a carrier signal on the power lines.

There has been described novel apparatus and techniques for effectively communicating over power lines with numerous advantages and features described above. It is apparent that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:
1. Synchronous power communicating apparatus for communication between a central station and remote stations over power lines that may also carry electrical power at power frequency comprising,
   a source of a carrier signal of frequency that is a harmonic of half said power frequency at said central and remote stations in the frequency range between 500 and 30 kHz for carrying digital data,
   a source of a digital data signal at said central and remote stations,
   means for establishing synchronism between each digital data signal and the electrical power frequency carried by said power lines, means for modulating a carrier signal with each digital data signal, means for coupling the modulated carrier signal to said power lines to transmit the modulated carrier signal over the power lines to a receiving means at each location including demodulating means for demodulating the modulated carrier signal to recover the digital data signal carried by the modulated carrier, means at each location coupling the modulated carrier signal from the power lines to said demodulating means, means for synchronizing the demodulating means with the electrical power carried by said power lines for demodulating the modulated carrier signal received at the receiving station to recover the digital data carried by the modulated carrier signal, the source of a digital data signal at said central location including means for providing a digital signal designating both a particular remote location to transmit a digital data signal to said central location and the data bit rate for transmission thereof that is a subharmonic of or the same as said power frequency, and means at each remote location responsive to reception of a digital control signal from said central location designating that remote location for transmission of a digital data signal to said central location for transmitting a digital data signal to said central location at the control designated data bit rate that is a subharmonic of or the same as said power frequency.

2. Synchronous power communicating apparatus in accordance with claim 1 wherein the frequency of said carrier signal is between 5 and 10 kHz and a predetermined harmonic of one-half said power frequency.

3. Synchronous power communicating apparatus in accordance with claim 2 wherein said means for modulating includes means for shifting the phase of the carrier signal in first and second opposed senses to designate first and second binary digit values respectively.

4. Synchronous power communicating apparatus in accordance with claim 3 wherein each carrier signal frequency is an odd harmonic of one-half said power frequency.

5. Synchronous power communicating apparatus in accordance with claim 3 wherein each carrier signal frequency is an even harmonic of said power frequency.

6. Synchronous power communicating apparatus in accordance with claim 3 and further comprising a source of a reference phase signal at each remote location and means for comparing the modulated carrier signal with the latter reference phase signal for detecting the binary bit then carried by the modulated carrier signal, and means responsive to the modulated carrier signal for adjusting the phase of said reference signal to a reference value substantially midway between said first and second opposed senses of the modulated carrier signal then being detected.

7. Synchronous power communicating apparatus in accordance with claim 1 and further comprising at least one distribution transformer intercoupling said central location and at least one of said remote locations through which the modulated carrier signals therebetween are transmitted.

8. Synchronous power communicating apparatus in accordance with claim 1 and further comprising, means for determining the phase of the electrical power at each remote location relative to that at said central location and providing a polarity signal associated with a remote location to transmit representative of the phase of the electrical power at that remote location relative to that at said central location for controlling the phasing of data bits exchanged between the central location and that remote location to accurately reflect the data carried by said data bits.

9. Synchronous power communicating apparatus in accordance with claim 1 wherein a remote location includes energy measuring means for providing a digital signal representative of energy used at said remote location for transmission over said power lines to said central location, and further comprising means for verifying both the digital data transmitted from said central location to said remote location and the digital data transmitted in response thereto from said remote location to said central location.

10. Synchronous power communicating apparatus in accordance with claim 1 wherein a remote station includes nonessential energy consuminng means and switching means responsive to a digital command energy signal for selectively preventing the flow of energy to said nonessential energy consuming means, means at said central location for providing as a said digital data signal said digital command energy signal, and means including the latter switching means at a remote station responsive to receipt of said digital command energy signal for preventing the flow of energy to said nonessential energy consuming means for a selected time interval.

11. Synchronous power communicating apparatus in accordance with claim 1 wherein a remote location includes distribution system configuration switching means responsive to a digital command distribution signal for selectively controlling the configuration of the power distribution system at that remote location, means at said central location for providing as a said digital data signal said digital command distribution signal, and means including the distribution system configuration switching means at a remote location responsive to receipt of said digital command distribution signal for establishing a selected configuration of the power distribution system at that remote location.

12. Synchronous power communicating apparatus in accordance with claim 11 and further comprising at least one power factor correction capacitor at said remote location and said distribution system configuration switching means includes means for selectively connecting said power factor correction capacitor to the power distribution system at that remote location, and said means including the distribution system configuration switching means includes means responsive to receipt of said digital command distribution signal for disconnecting said power factor correction capacitor from the latter power distribution system.

13. Synchronous power communicating apparatus in accordance with claim 1 and further comprising at least one power factor correction capacitor at a remote location, and means for coupling said power factor correction capacitor to said power lines through means characterized by a low first impedance at said power frequency and a much higher second impedance at the frequency of said carrier signal.

14. Synchronous power communicating apparatus in accordance with claim 13 wherein the latter means for coupling comprises a tuned circuit having a resonant frequency substantially at the frequency of said carrier signal.

15. Synchronous power communicating apparatus in accordance with claim 1 wherein a remote location includes parameter measuring means for providing a digital signal representative of an operating parameter of the power distribution system at the remote location for transmission over said power lines to said central location.

16. Synchronous power communicating apparatus in accordance with claim 1 wherein a remote location includes signal switching means responsive to a digital command signal selection signal for selectively coupling signals to power distribution lines at said remote location,
   means at said central location for providing as a said digital data signal said digital command signal selection signal,
   and means including the signal switching means at the remote location responsive to receipt of said digital command signal selection for selectively coupling signals to the latter power distribution lines.

17. Synchronous power communicating apparatus in accordance with claim 1 wherein a remote location includes a plurality of measuring means for providing respective digital measurement signals representative of a measured quantity at the remote location for transmission over said power lines to said central location,
   means at said central location for producing as a said digital data signal a digital command measuring signal designating respective ones of said digital measurement signals for transmission to said central location,
   and means at the remote location responsive to said digital command measuring signal for transmitting the designated digital measurement signal to said central location over said power lines.

18. Synchronous power communicating apparatus in accordance with claim 1 wherein the source of a digital data signal includes means for providing a predetermined sequence of digital data signals as a synchronizing signal for enabling accurate decoding of the information portions of said digital data signal in the presence of noise signals at said power line frequency.

19. Synchronous power communicating apparatus in accordance with claim 1 wherein said source of a carrier signal includes means responsive to said electrical power at power frequency for deriving said carrier signal from said electrical power so that the frequency of said carrier signal tracks that of said electrical power from which the carrier signal frequency is derived.

20. Synchronous power communicating apparatus in accordance with claim 1 and further comprising means for adjusting said designated data bit rate to the highest value consistent with acceptable transmission accuracy for the then capacity of the communication channel comprising said power lines.

21. In apparatus for communicating from a central station to a plurality of remote stations over power lines that may also carry electrical power at power frequency, wherein the apparatus comprises transmitter means at the central station and receiver means at each remote station, the transmitter means and each receiver means being coupled to the power lines to transmit and receive signals thereover, respectively, wherein said transmitter means comprises a source of a carrier signal, a source of a digital data signal and modulation means for modulating said carrier signal with said digital data signal, and wherein each receiver means comprises demodulation means for demodulating the modulated carrier signal to recover the digital data signal carried by the modulated carrier signal,
   the improvement wherein,
   said source of a carrier signal has a frequency that is a harmonic of one-half said power frequency and is within the range of 500 Hz to 30 kHz,
   the data bit rate of transmission is a subharmonic of, or the same as, said power frequency,
   the transmitter means further comprises means synchronizing the modulation means with the electrical power frequency carried by said power lines, and
   each receiver means further comprises means synchronizing the demodulation means with the electrical power frequency carried by said power lines.

* * * * *

UNITED STATES PATENT OFFICE
CERTIFICATE OF CORRECTION

PATENT NO. : 4,012,734
DATED : March 15, 1977
INVENTOR(S) : Neil H. Jagoda et al.

It is certified that error appears in the above-identified patent and that said Letters Patent are hereby corrected as shown below:

Column 8, line 36, should read -- $C_{14}$ Feeder 3 Phase A Selector Relay ON --.

Column 9, line 43, $\bar{M}_0$ through $\bar{M}_{19}$ should read -- $M_0$ through $M_{19}$ --.

line 44, $M_0$ should read -- $\bar{M}_0$ --.

line 45, $M_{19}$ should read -- $\bar{M}_{19}$ --.

Column 17, line 9, $2\tau$ should read -- $2\pi$ --.

line 18, Wrt + Whc should read -- $W_{rt} + \phi_{hc}$ --.

Column 18, line 68, lm 139 should read -- LM139 --.

Column 22, line 45, 265, 270 and 260 should read -- 265, 254, 270 and 260 --.

Column 23, lines 13 and 14, 316'λ''' should read -- 316'''' --.

Column 32, line 24, consuminng should read -- consuming --.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks